US012631598B2

(12) United States Patent
　　Esplin

(10) Patent No.:　US 12,631,598 B2
(45) Date of Patent:　May 19, 2026

(54) DETERMINING ACOUSTIC CHARACTERISTICS OF SAMPLE CONTAINERS AND FLUID SAMPLES THEREIN USING REFLECTED ACOUSTIC SIGNALS

(71) Applicant: LABCYTE INC., San Jose, CA (US)

(72) Inventor: J. James Esplin, San Jose, CA (US)

(73) Assignee: LABCYTE INC., San Jose, CA (US)

( * ) Notice:　Subject to any disclaimer, the term of this patent is extended or adjusted under 35 U.S.C. 154(b) by 300 days.

(21) Appl. No.: 18/287,741

(22) PCT Filed: Aug. 18, 2022

(86) PCT No.: PCT/US2022/040768
§ 371 (c)(1),
(2) Date: Oct. 20, 2023

(87) PCT Pub. No.: WO2023/027943
PCT Pub. Date: Mar. 2, 2023

(65) Prior Publication Data
US 2024/0192178 A1　Jun. 13, 2024

Related U.S. Application Data

(60) Provisional application No. 63/236,982, filed on Aug. 25, 2021.

(51) Int. Cl.
*G01N 29/265*　(2006.01)
*G01F 23/2962*　(2022.01)
(Continued)

(52) U.S. Cl.
CPC ....... *G01N 29/265* (2013.01); *G01F 23/2962* (2013.01); *G01N 29/024* (2013.01);
(Continued)

(58) Field of Classification Search
CPC .. G01N 29/265; G01N 29/024; G01N 29/028; G01N 29/032; G01N 29/043;
(Continued)

(56) References Cited

U.S. PATENT DOCUMENTS

| | | |
|---|---|---|
| 4,254,660 A | 3/1981 | Prause |
| 4,350,045 A | 9/1982 | Chow et al. |

(Continued)

FOREIGN PATENT DOCUMENTS

| | | |
|---|---|---|
| CN | 109612414 | 4/2019 |
| JP | 5938908 | 3/1984 |

(Continued)

OTHER PUBLICATIONS

International Search Report and Written Opinion corresponding to International Patent Application No. PCT/US2022/040768, mailed Jan. 18, 2023.

*Primary Examiner* — Xin Y Zhong
(74) *Attorney, Agent, or Firm* — Kinney & Lange, P.A.

(57)　　　　ABSTRACT

The present application relates to a liquid transfer system capable of using ultrasonic sound signals to transfer liquid samples from a first container to a second container as well as using ultrasonic sound signals to measure the characteristics of both the liquid and the first container. The system uses a transducer to transmit a plurality of sound signals and receives a plurality signals reflected off the sample and the bottom wall of the container to measure the liquid and/or container characteristics. The plurality of transmitted sound signals occur during a plurality of transducer positions from the first container in which the system identifies the signal converging on various surfaces of the liquid and/or container, and uses the reflected signals corresponding to those positions to calculate the sample and container characteristics.

10 Claims, 14 Drawing Sheets

(51) Int. Cl.

| | |
|---|---|
| *G01N 29/024* | (2006.01) |
| *G01N 29/028* | (2006.01) |
| *G01N 29/032* | (2006.01) |
| *G01N 29/04* | (2006.01) |
| *G01N 29/07* | (2006.01) |
| *G01N 29/09* | (2006.01) |
| *G01N 29/11* | (2006.01) |
| *G01N 29/28* | (2006.01) |
| *G01N 29/44* | (2006.01) |
| *G01N 29/48* | (2006.01) |

(52) U.S. Cl.
CPC ......... *G01N 29/028* (2013.01); *G01N 29/032* (2013.01); *G01N 29/043* (2013.01); *G01N 29/07* (2013.01); *G01N 29/09* (2013.01); *G01N 29/11* (2013.01); *G01N 29/28* (2013.01); *G01N 29/4454* (2013.01); *G01N 29/48* (2013.01); *G01N 2291/02854* (2013.01); *G01N 2291/2638* (2013.01); *G01N 2291/2695* (2013.01)

(58) Field of Classification Search
CPC ........ G01N 29/07; G01N 29/09; G01N 29/11; G01N 29/28; G01N 29/4454; G01N 29/48; G01N 2291/02854; G01N 2291/2638; G01N 2291/2695; G01F 23/2962; G01F 23/296; G01H 3/14
See application file for complete search history.

(56) References Cited

U.S. PATENT DOCUMENTS

| | | | |
|---|---|---|---|
| 2004/0009611 A1 | 1/2004 | Williams et al. | |
| 2007/0053795 A1* | 3/2007 | Laugharn, Jr. .......... | B01F 31/87 |
| | | | 73/644 |
| 2007/0214880 A1 | 9/2007 | Spanke et al. | |
| 2008/0173077 A1* | 7/2008 | Ellson .................. | B01L 3/0268 |
| | | | 73/64.53 |
| 2015/0168204 A1 | 6/2015 | Meyer et al. | |
| 2017/0102362 A1* | 4/2017 | Sackmann ............. | G01N 29/07 |

FOREIGN PATENT DOCUMENTS

| | | |
|---|---|---|
| JP | 0518942 | 1/1993 |
| JP | 06-221843 | 8/1994 |
| JP | 2017066116 | 2/2017 |
| WO | 03106179 | 12/2003 |

* cited by examiner

Direction of travel of the Transducer Assembly over time

DETERMINING ACOUSTIC CHARACTERISTICS OF SAMPLE CONTAINERS AND FLUID SAMPLES THEREIN USING REFLECTED ACOUSTIC SIGNALS

BACKGROUND

Generally, this application relates to systems and methods for determining material characteristics of a multi-cavity microplate and the liquids contained therein for use in acoustic droplet ejection systems.

Acoustic droplet ejection (ADE) is a technology that uses acoustic energy to move a liquid without any physical contact. Some examples of ADE technology are disclosed in U.S. Pat. No. 10,156,499, which is incorporated herein by reference in its entirety. Acoustic energy (e.g., in the form of ultrasonic pulses) is emitted from a transducer towards a volume of liquid (hereinafter, "sample"). In some examples, the beam converges on the upper surface of the sample, and the acoustic energy is transferred to a portion of the sample, thereby causing this portion to move upwardly away from the remainder of the sample (e.g., as a droplet).

In these examples, the sample is contained within a container, and the transducer is positioned underneath the container. Therefore, the acoustic radiation must pass through at least a bottom wall of the container as well as the liquid before it reaches the upper surface of the sample. The transmitted acoustic radiation is reflected back towards the transducer. Properties of the reflected radiation (e.g., the transmission path and attenuation of energy) can be measured or inferred to determine certain characteristics of the media through which it travelled. The precision of ADE can be improved by accounting for the characteristics of these mediums.

For the container, it can be helpful to know properties such as density, speed at which acoustic energy propagates (hereinafter, "sound speed"), thickness of the bottom wall of the container, and the degree to which acoustic energy attenuates. For the sample, it can be helpful to know properties such as density, sound speed, depth of the sample, and the degree to which acoustic energy attenuates. Knowledge of characteristics of the sample can also be beneficial, and such characteristics can include depth and volume of the sample. Additionally, determining the density and energy attenuating properties of the sample can also be beneficial, for example, to verify characteristics of the sample. For example, such verification can be improved by comparing expected and measured values of the reflected acoustic radiation.

One example of a container is a well in a microplate such as a 96- or 384-well plate (e.g., a 384-PP microplate). Other examples of containers include tubes, flasks, and beakers. For the example of a microplate, the characteristics of each well (e.g., the base of each well) vary from one to another on a single microplate, for example, due to variations in manufacturing. Such variations can be in the thickness and consistency of the bottom wall of the containers. Variations can occur from well-to-well or from plate-to-plate.

Such container characteristics can be determined to an extent in advance of performing ADE. For example, if certain properties of the material for a used to make a given container are known in advance, characteristics of the container can be inferred. However, in the case of microplates, the material can vary in consistency from batch-to-batch or plate-to-plate. Additionally, the thickness of the containers may vary (e.g., from plate-to-plate or from well-to-well) due to process inconsistencies or tolerances. One such process is injection molding. Even slight variations can affect ADE precision or accuracy. As an example, in the case of injection molding, multiple molds or mold cavities can be used (e.g., to increase the manufacturing rate). These can vary, and it difficult or inefficient to reduce such variances to the extent that container consistency will not substantially affect ADE. Additionally, inconsistencies in the manufacturing process can lead to inconsistencies between different plates. For example, it can be impossible, impractical, or expensive to strictly control injection rates, cooling rates, the composition of liquid plastic.

Another way to improve consistency is to inspect containers after they are formed and reject those that do not pass quality control. This can require resources, such as time, money, and labor, as well as wasting material, consuming energy, and decreasing output.

A different approach to improving ADE results is to characterize containers, such as microplates, after manufacturing (e.g., on a plate-by-plate or batch-by-batch basis). For example, each container can be separately assessed to determine particular characteristics in advance of adding sample (s). The container can be tagged with an identifier, such that an ADE system can retrieve the pre-determined characteristics when performing an assay. Then, each container can be identified using techniques such as RFID, optical scanning, or by using "acoustic barcodes" as described in U.S. Pat. Nos. 10,592,793 and 10,766,027, which are herein incorporated by reference in their entirety. As another option, characteristics for a given container can be manually entered.

SUMMARY

Certain embodiments of the present technology relate to a system capable of acoustically measuring at least one characteristic of a liquid sample within a container. The system includes a transducer assembly capable of emitting signals (e.g., acoustic signals) towards the bottom wall of the container and receive the corresponding signals (e.g., acoustic reflections) reflected off the sample and the container. The system also includes a controller to move the transducer assembly in a vertical direction towards the container allowing the signals to be emitted at various positions spaced away from the container. A processor uses the various reflected signals to determine the characteristics of the sample and the container. The transducer assembly focuses the emitted signal with an acoustic lens to a focal point. The emitted signal converges at a convergence point.

The processor uses the interaction of the signal convergence points with various surfaces of the sample and container in order to calculate the sample and container characteristics of concern. The processor may calculate characteristics of the sample including one or more of a depth, an acoustic impedance, and a sound speed of the emitted signal through the sample. The processor may also calculate characteristics of the container including one or more of a wall thickness, an acoustic impedance, a longitudinal sound speed of the emitted signal, and a shear sound speed of the emitted signal.

For illustrative purposes, in some examples, the container may have two or more wells with corresponding two or more samples in the wells. The controller may be able to move the transducer assembly horizontally such that the transducer assembly moves sequentially underneath the three or more wells. In some examples, the controller may be able to move the transducer assembly horizontally along two dimensions (e.g., X and Y directions along a horizontal XY-plane). For example, the container may include three or more wells arranged such that the transducer assembly may need to move in both X and Y directions to access all the wells. The system may be able to calculate the sample and container characteristics for the corresponding well the transducer assembly is moved under before moving to the subsequent well. The transducer assembly may also be used to acoustically transfer a droplet from the sample within the container to a second container. The transfer of the sample droplet occurs after the system determines the corresponding characteristics of a given well and sample, and may occur prior to the system moving the transducer assembly to the subsequent well.

The system may include a reference object which may be used as part of characterizing a well and/or liquid of the container. The reference object may be disposed such that the transducer is capable of emitting at least one signal towards the reference object and receiving a reflected signal from the reference object. The system may be able to determine at least one characteristic of the reference object. The system may emit a plurality of signals towards and receive a plurality of reflected signals from the reference object while moving towards the reference object. The emitted signals towards the reference object and the emitted signals towards the bottom wall of the container may have the same wavelength, duration, and energy level.

The system may have a coupling liquid between the transducer assembly and the container with a temperature sensor and a corresponding processor to measure the temperature of the coupling liquid.

The transducer assembly may include an acoustic lens maintained at a fixed distance and position from the transducer. The acoustic lens may define a focal point for each of a plurality of emitted signals. Each of the emitted signals may converge at a convergence point. The system may recognize a convergence point being on a first surface of the surface of the container or the liquid. The system may recognize a convergence point being on a second surface of the container or the liquid.

In some embodiments, the system may be capable of acoustically measuring at least one characteristic of a container. The system includes a transducer assembly capable of emitting signals towards the bottom wall of the container and receive the corresponding signals reflected off the container. The system also includes a controller to move the transducer assembly in a vertical direction towards the bottom wall of the container allowing the signals to be emitted at various heights from the container bottom wall. A processor uses the various reflected signals to determine the characteristics of the container bottom wall. The transducer assembly focuses the emitted signal with an acoustic lens to a focal point. The emitted signal converges at a convergence point.

The processor uses the interaction of the convergence points with various surfaces of the container bottom wall in order to calculate the container characteristics of concern. The processor may calculate characteristics of the container bottom wall including a wall thickness, an acoustic impedance, a longitudinal sound speed of the emitted signal, and a shear sound speed of the emitted signal.

The container may have three or more wells. The controller may be able to move the transducer assembly horizontally such that the transducer assembly moves sequentially underneath the three or more wells. The system may be able to calculate the container bottom wall characteristics for the corresponding well the transducer assembly is moved under before moving to the subsequent well.

The system may include a reference object in which the transducer is capable of emitting at least one reference signal towards and receiving a reflected signal. The system may be able to determine at least one characteristic of the reference object. The system may emit a plurality of signals towards the reference object and receive a plurality of reflected signals from the reference object while moving towards the reference object. The emitted signals towards the reference object and emitted signals towards the container bottom wall may have the same wavelength, duration, and energy level.

The system may have a coupling liquid between the transducer assembly and the container bottom wall with a temperature sensor and a corresponding processor to measure the temperature of the coupling liquid.

The transducer assembly may include an acoustic lens maintained at a fixed distance and position from the transducer. The acoustic lens may define a focal point for each of a plurality of emitted signals. Each emitted signal may converge at a convergence point. The system may recognize the convergence point being on a first surface of the surface of the container or the liquid. The system may recognize the convergence point being on a second surface of the container or the liquid.

Some embodiments of the present technology relate to a system capable of acoustically measuring at least one characteristic of a container holding a sample. The system includes a transducer assembly capable of emitting signals towards the bottom wall of the container and receive the corresponding signals reflected off the container. The system also includes a processor capable of measuring at least one characteristic of the container by identifying a first, second, and third peak of the reflected signal. The reflected signal includes a plurality of echoes, and the processor recognizes that each of the three peaks corresponds to a different echo of the plurality of echoes. The detected characteristic may include an acoustic impedance, a bottom wall thickness, a longitudinal sound speed, or a shear sound speed of the container.

The processor is further configured to identify the first peak as corresponding to an echo from the bottom of the container, the second peak as corresponding to an echo from a longitudinal wave reflecting off the top surface of the bottom of the container, and a third peak as corresponding to an echo from shear waves reflecting off the top surface of the bottom of the container.

The system may measure a fourth peak of the reflected signal corresponding to an echo of the free surface of the liquid. The system may measure a sound speed of the emitted signal, an acoustic impedance, or a depth of the liquid.

In some embodiments, the present technology may relate to a system capable of acoustically measuring at least one characteristic of a liquid sample within a container. The system includes a transducer assembly capable of emitting a signal towards the bottom wall of the container and receive the corresponding signal reflected off the sample and the container. The reflected signal includes a plurality of echoes. The processor is able to measure at least once characteristic based on a first peak and a second peak of the reflected signal. The processor is further capable of recognizing one of the peaks corresponds to the echo from a shear wave reflected from a surface of the container, while another peak corresponds to the echo from a longitudinal wave reflected from a container surface. The system may recognize the first peak and the second peak correspond to echoes reflected off the same container surface. The system may recognize the first peak and the second peak correspond to echoes reflected off different container surfaces.

In some embodiments, the present technology may relate to a system capable of acoustically measuring at least one characteristic of a liquid sample within a container. The system includes a transducer assembly capable of emitting a signal towards the bottom wall of the container and receive the corresponding signal reflected off the sample and the container. The reflected signal includes a plurality of echoes. The processor is able to measure at least one characteristic based on the delay in time of the echoes, but not the amplitude of the echoes while measuring a second characteristic based on the amplitude of the echoes and not the time of the echoes.

In some embodiments, the present technology may relate to a system capable of measuring at least one characteristic of an item. The system includes a transducer assembly capable of emitting a first and second signal towards the base of the item and receive the corresponding signals reflected off the item. The system also includes a controller to move the transducer assembly along a vertical direction relative to the item. The system includes a processor to measure a characteristic of the item. The system emits the first signal at on vertical distance from the item and the second signal at a different vertical distance from the item. The emitted signal may be an acoustic signal.

In some embodiments, the present technology may relate to a system capable of acoustically measuring at least one characteristic of an item. The system includes a transducer assembly capable of emitting a signal towards the base of the item and receive the corresponding signal reflected off the item. The system having a processor capable of measuring at least one characteristic of the item by processing the data corresponding to a first, second and third peak of the reflected signal and recognizing the first, second, and third peaks correspond to different echoes.

Some embodiments include a method for determining a characteristic of a liquid within a container. The method includes receiving a container by a measurement system that has a transducer. The method also includes transmitting and receiving a plurality of acoustic signals by the transducer at a plurality of distances from the container. The method also includes calculating physical characteristics of the liquid or the container based on differences between the received signals.

Some embodiments include a method for determining a characteristic of a container. The method includes receiving a container by a measurement system that has a transducer. The method includes transmitting and receiving a plurality of acoustic signals by the transducer at a plurality of distances from the plate. The method includes calculating physical characteristics of the liquid or the container based on differences between the received signals.

Figures 1, 2:
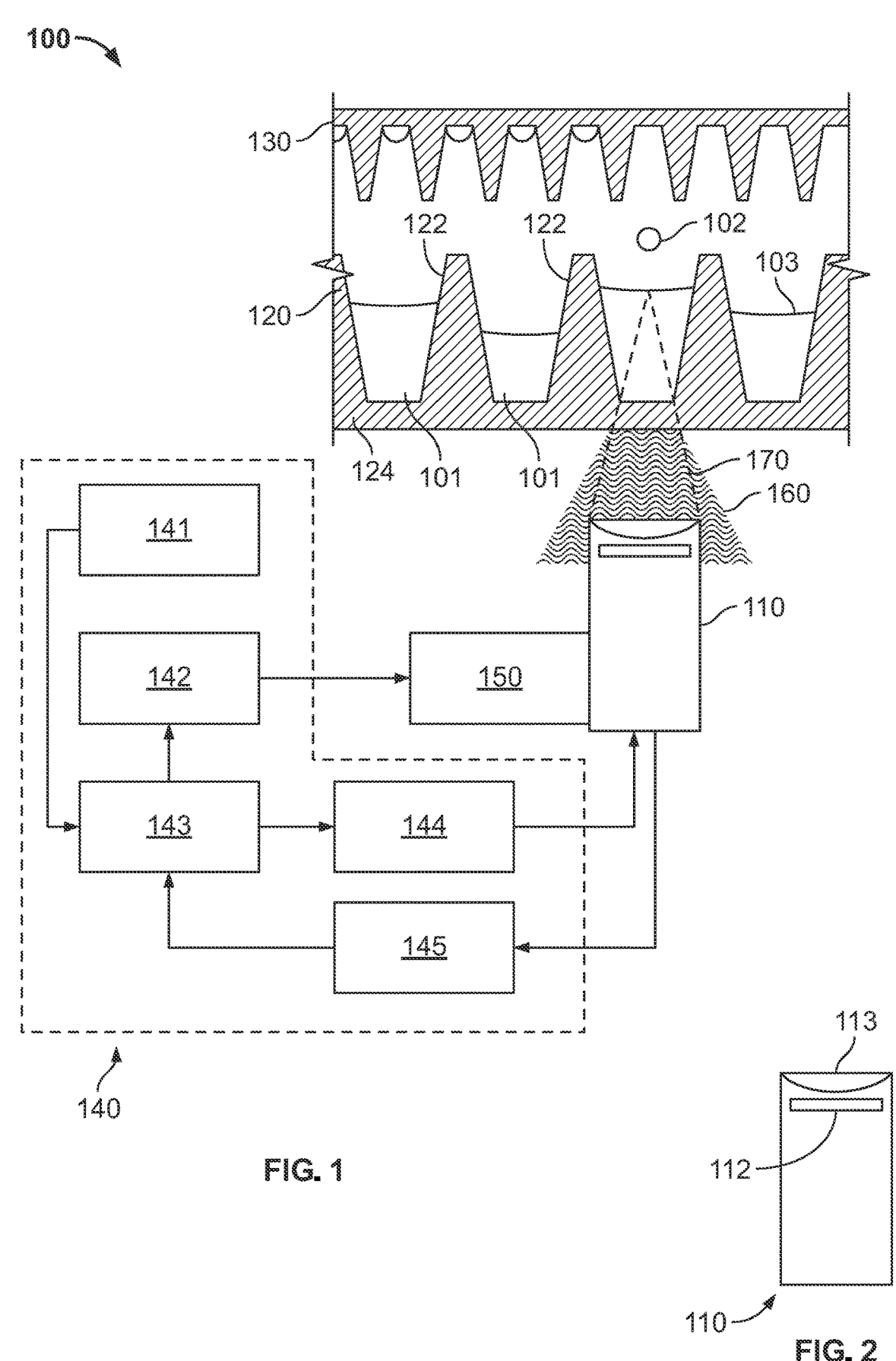
FIG. 1 shows a representation of an ADE system, including a cross-sectional view a container plate including a plurality of containers holding a respective plurality of samples, receiver plate, a transducer assembly, and a block diagram of electronic circuitry.
FIG. 2 shows a block diagram of a transducer assembly.

The foregoing description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings.

DETAILED DESCRIPTION

FIG. 1 depicts an example ADE system 100, including a cross-sectional view of a container plate 120 (e.g., a microplate) including a plurality of containers 122 (e.g., wells of a microplate) holding a respective plurality of samples 101, receiver plate 130 including a plurality of receiver wells that receive ejected liquid 102 from the sample 101, and a block diagram of electronics 140. The ADE system 100 further includes a transducer assembly 110, a coupling liquid 160, X/Y/Z motors 150, and temperature sensors (not shown). FIG. 2 further shows the transducer assembly 110, including a transducer 112 and acoustic lens 113. The ADE system 100 can determine characteristics of both the containers 122 and the samples 101, as well as cause liquid to be ejected. A sample 101 is a liquid of interest that is held within a particular container 122. Although the disclosure focuses on containers that are wells of microplates, techniques described herein can be used to characterize other containers such as tubes, flasks, and beakers, as well as any samples contained therein.

In order to cause the ejected liquid 102 to be ejected from the sample 101, the transducer 112 generates acoustic energy (e.g., ultrasonic energy), which is focused then by the acoustic lens 113 into a beam 170. In the figures, the beam 170 is shown in two dimensions, but it is understood that it is three dimensional. Furthermore, the beams 170 in FIGS. 1-7 are shown as perfect triangles, but in practice, the beams 170 can have different shapes, as depicted for example in FIGS. 12C-12E. Strictly speaking, the triangular beams 170 have focal points that are coincident with convergence points. All beams 170 in FIGS. 1, 3, 6, and 7 are triangular to simplify issues and to make the discussion clearer. However, as will become apparent, some of the beams in these figures are not triangular in practice.

In the context of ADE, the term "focus" can be used with reference to a focal point associated with an acoustic lens and also with reference to the point at which the acoustic waves converge (i.e., the convergence point). In many cases, this usage can be helpful and provide clarity. However, certain techniques disclosed herein distinguish between the concepts of a focal point and a convergence point. Therefore, these concepts are distinctly described.

In FIG. 1, the beam 170 is focused on the upper surface of the sample 101. First, the beam 170 passes through the coupling liquid 160, a bottom wall 124 of the container 122, and then the depth of sample 101 to reach the free surface 103 of the sample 101.

The electronic circuitry 140 includes a processor 143, a motor controller 142, transmit signal circuitry 144, receive signal circuitry 145, and temperature sensor circuitry 141. Although shown as separate components for explanatory purposes, portions of the electronics 140 may be combined or integrated. Furthermore, some components may include multiple different subcomponents. For example, the processor 143 may include multiple processors.

The processor 143 causes the transmit signal circuitry 144 to generate an analog electrical signal, which is communicated to the transducer 112. The transducer 112 then vibrates in response to the analog signal (amplitude and frequency), such that a corresponding acoustic signal is emitted. The transducer assembly 110 may also receive acoustic signals (e.g., acoustic signals reflected from the container or the liquid within the container in response to the emitted acoustic signal) and vibrate sympathetically. This may generate an analog electrical signal, which is then communicated to the receive signal circuitry 145. The information in the reflected acoustic signal will be analyzed by the processor 143.

The processor 143 can also communicate with the motor controller 142 to control the location of the transducer assembly 110. The motor controller 142 controls one or more of the X/Y/Z motors 150 to move the transducer assembly 110 relative to the container plate 120. As shown, the X/Y/Z motors 150 are coupled (directly or indirectly) to the transducer assembly 110, but these or other motors may be coupled (directly or indirectly) to the container plate 120 and/or the receiver plate 130 in order control the relative movement between the transducer assembly 110, the container plate 120, and/or the receiver plate 130.

In some embodiments, the ADE system 100 may include temperature sensors (not shown) that can be located in the coupling liquid 160, in a region between the container plate 120 and the receiver plate 130, or other locations. The temperature sensor circuitry 141 receives signals (e.g., electrical or wireless) from the sensors, and communicates with the processor 143 such that temperatures (e.g., of the coupling liquid 160, the containers 122, the samples 101, air temperature) can be measured.

In some examples, the transducer assembly 110 can have a cylindrical shape. In some examples, instead of using a single transducer 112 to both transmit and receive acoustic signals, the transducer assembly 110 may include separate transmitter and receiver transducers, for example, as disclosed in U.S. Pat. No. 10,787,670, which is herein incorporated by reference in its entirety. According to one technique, receiving transducer can substantially surround the transmitting transducer and acoustic lens.

Figure 3:
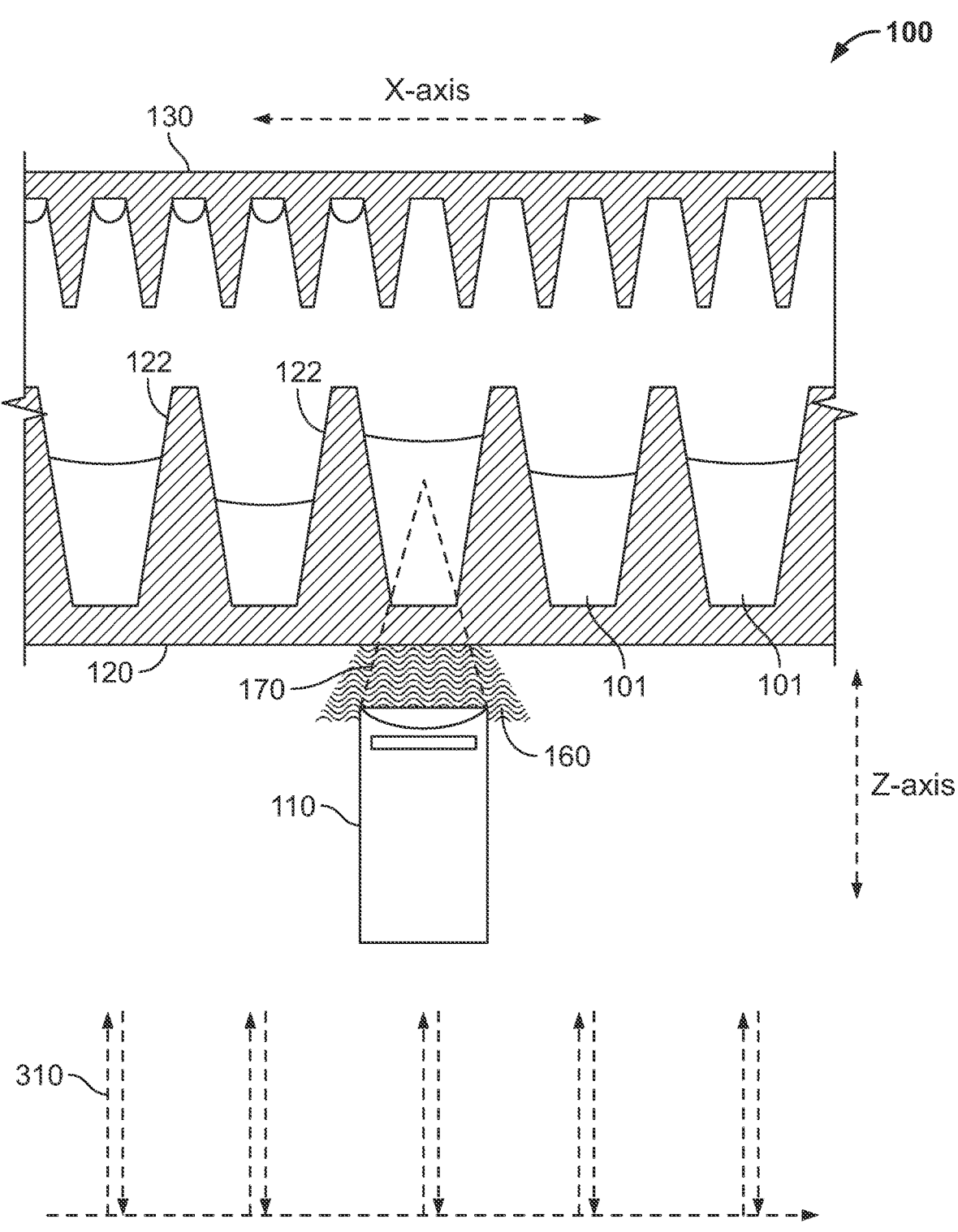
FIG. 3 shows a representation of movement of the transducer assembly relative to a container plate when performing ADE on multiple samples.

FIG. 3 shows a representation of movement of the transducer assembly 110 relative to a container plate 120 when performing ADE on multiple samples 101. The transducer assembly 110 is moved from container-to-container 122 along the x-axis. The transducer assembly 110 can also move along the y-axis to additional containers 122 (not shown) as further described with respect to FIG. 5. For each container 122, the transducer assembly 110 is centered underneath the container 122. Then, to characterize the container 122 and/or sample 101 as described herein, the transducer assembly 110 moves vertically along the z-axis and emits a sequence of acoustic signals at different z-positions beneath the container 122. This process is sometimes referred to herein as a "sweep." Subsequent to characterization, the transducer assembly 110 can be positioned along the z-axis to focus a subsequent beam 170 on the free surface 103 of the sample 101 to cause the ejected liquid 102 to be ejected. In some embodiments, characterization and ejection can be performed on a container-by-container basis in an alternating manner (e.g., characterizing a first container 122 and/or sample 101 and then ejecting a droplet 102 before repeating the process on a second container 122 and sample 101). Alternatively, a plurality of containers 122 can be characterized before the liquid ejection phase is performed.

FIG. 3 illustrates five sweeps 310 performed on five different containers 122. Although the disclosure focuses on ejection of droplets 102 once a container 122 is characterized, the disclosure also contemplates other actions. For example, rather than ejecting a droplet 102 from a container 122, the system 100 may be used to perturb a sample 101 within the container 122 by a predetermined amount using an sub-ejection acoustic signal that is beneath a threshold amount required for ejecting a droplet 102.

Figure 4:
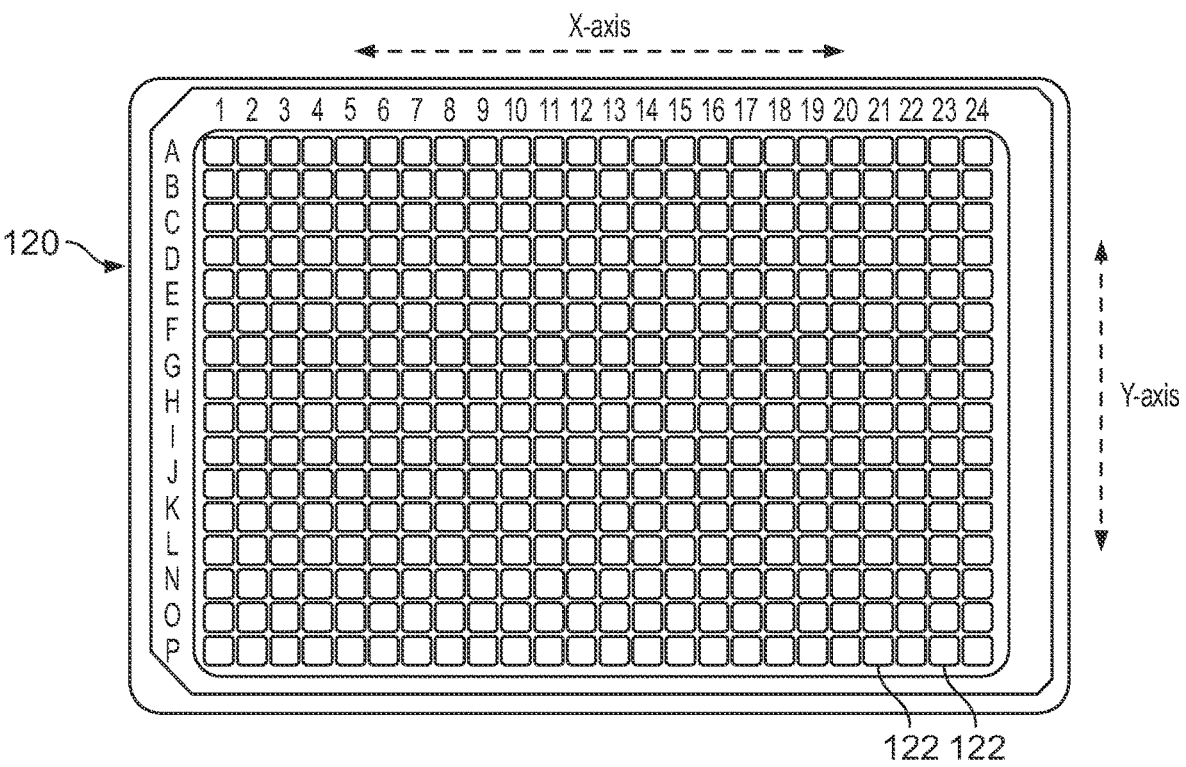
FIG. 4 shows a top view of a container plate with a plurality of containers.
Figure 5:
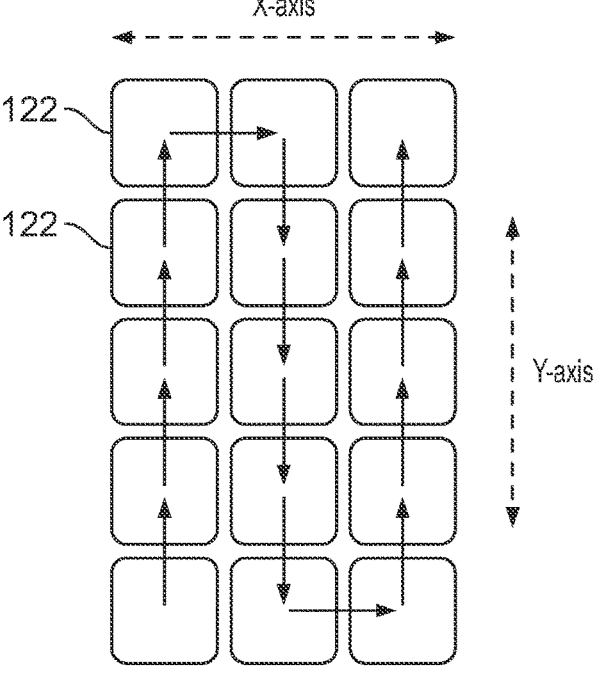
FIG. 5 shows a top view of a plurality of containers in a container plate and a flow illustrating a sequence for serially performing ADE on each container.

FIG. 4 shows a top view of a container plate 120 having a plurality of containers 122. The container plate 120 shown is a 384-well microplate (e.g., a polypropylene microplate, designated 384-PP). FIG. 5 a top view of a plurality of container wells 122 and an example pattern (a serpentine pattern) for performing characterization and/or ADE on each container well 122 and sample 101 therein, as described with respect to FIG. 3. In this example, the motors 150 will move the transducer assembly 110 along the x- and y-axes to position it under the various container wells 122. Any other suitable pattern may be used (e.g., a raster pattern).

Figure 6:
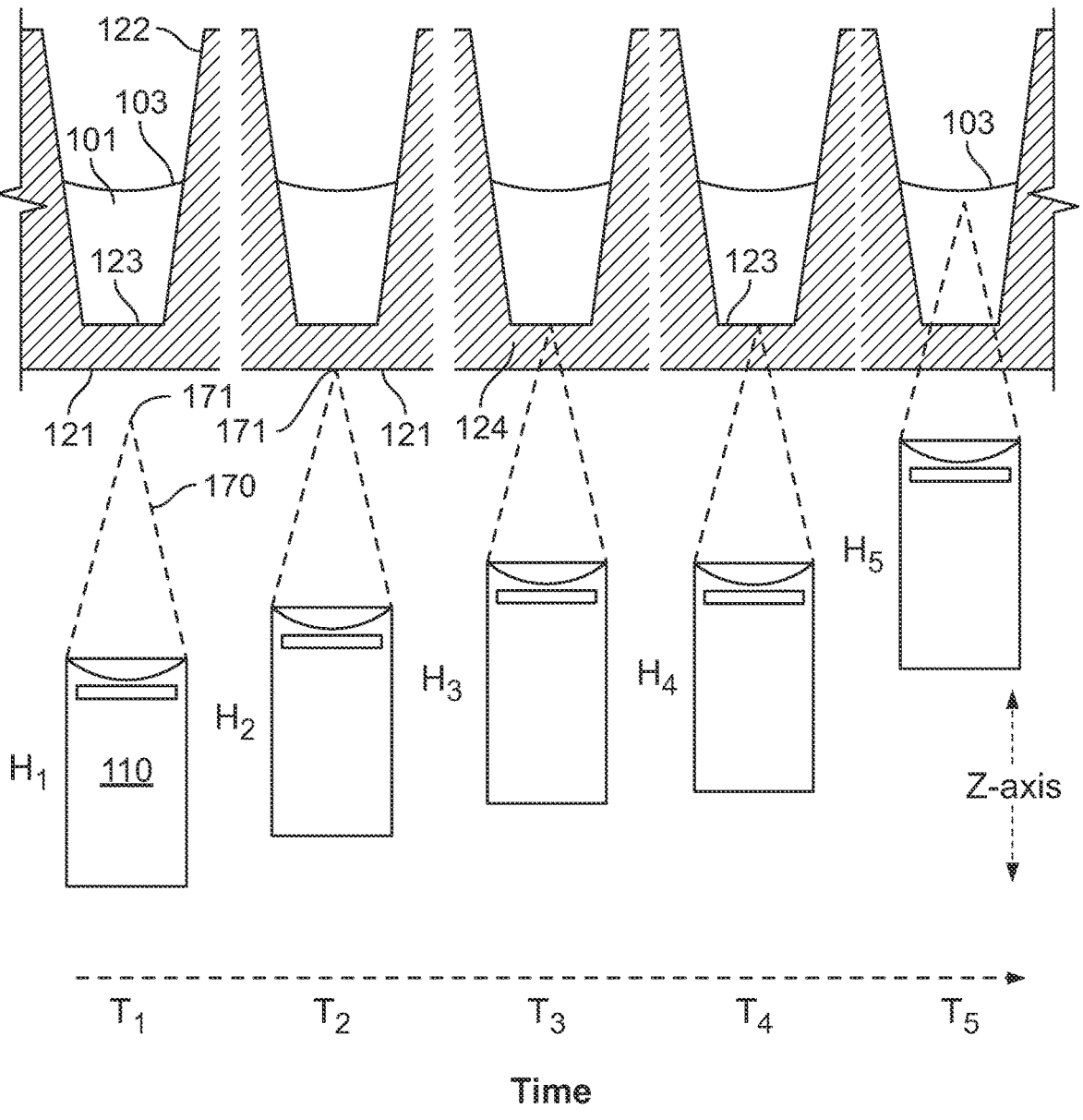
FIG. 6 shows a representation of vertical movement of the transducer assembly and emitted acoustic radiation along the z-axis over time with respect to a single container and sample, according to certain embodiments.

FIG. 6 shows the movement of the transducer assembly 110 during a sweep of one container 122 and sample 101 from time $T_1$ to $T_5$. Each acoustic energy beam 170 emitted from the transducer assembly 110 has a convergence point 171. The acoustic lens 113 causes the beam 170 to focus on a focal point. The convergence point 171 may or may not be coincident with the focal point, depending on the characteristics of the media that the beam 170 travels through, as will be further explained below. Examples of the convergence point 171 differing from the focal point are depicted in FIGS. 12C-12E (the focal point is referenced as 172).

The convergence point 171 moves along the z-axis with the transducer assembly 110. During the sweep, the transducer assembly 110 moves along the z-axis while centered underneath a given container 122. In this example, the transducer assembly 110 emits a beam 170 at five z-positions ($H_1$, $H_2$, $H_3$, $H_4$, and $H_5$) at corresponding times ($T_1$, $T_2$, $T_3$, $T_4$, and $T_5$). The transducer assembly 110 also receives reflected acoustic energy in response to each transmitted beam 170. The transducer assembly 110 may or may not be at the same z-position during transmission and reception (and the ADE system 100 may account for this mathematically when processing the received reflected signals). FIG. 6 does not show the coupling liquid 160, but it is interposed between the transducer assembly 110 and the container 122 as shown in FIGS. 1 and 3.

FIG. 6 provides an overview of the detailed discussion to follow. At time $T_1$, the transducer assembly 110 is positioned at z-position $H_1$ such that the convergence point 171 of the beam 170 is below the lower surface 121 of the container bottom wall 124. At time $T_2$, the transducer assembly 110 is positioned at z-position $H_2$, such that the convergence point 171 aligns with the lower surface 121 of the container bottom wall 124. At time $T_3$, the transducer assembly 110 is positioned at z-position $H_3$ such that the convergence point 171 of a longitudinal wave is at the upper surface 123 of the container bottom wall 124. At time $T_4$, the transducer assembly 110 is positioned at z-position $H_4$ such that the convergence point 171 of a shear wave is at the upper surface 123 of the container bottom wall 124. The significance of shear waves and longitudinal waves will further be described below. At time $T_5$, the transducer assembly 110 is positioned at z-position $H_5$ such that the convergence point 171 is at the free surface 103 of the sample 101. Although FIG. 6 shows five z-positions along the z-axis, the sweep may be performed at any suitable number of z-positions of the transducer assembly 110. In some examples, the z-positions of the transducer assembly 110 may incrementally increase by a specified distance between each transmission. In other examples, the system 100 may predict the z-positions of interest for the transducer assembly 110 and perform the incremental transmissions within a range below and above the predicted z-positions of interest and omit the transmissions when outside of those predicted ranges.

Figure 7:
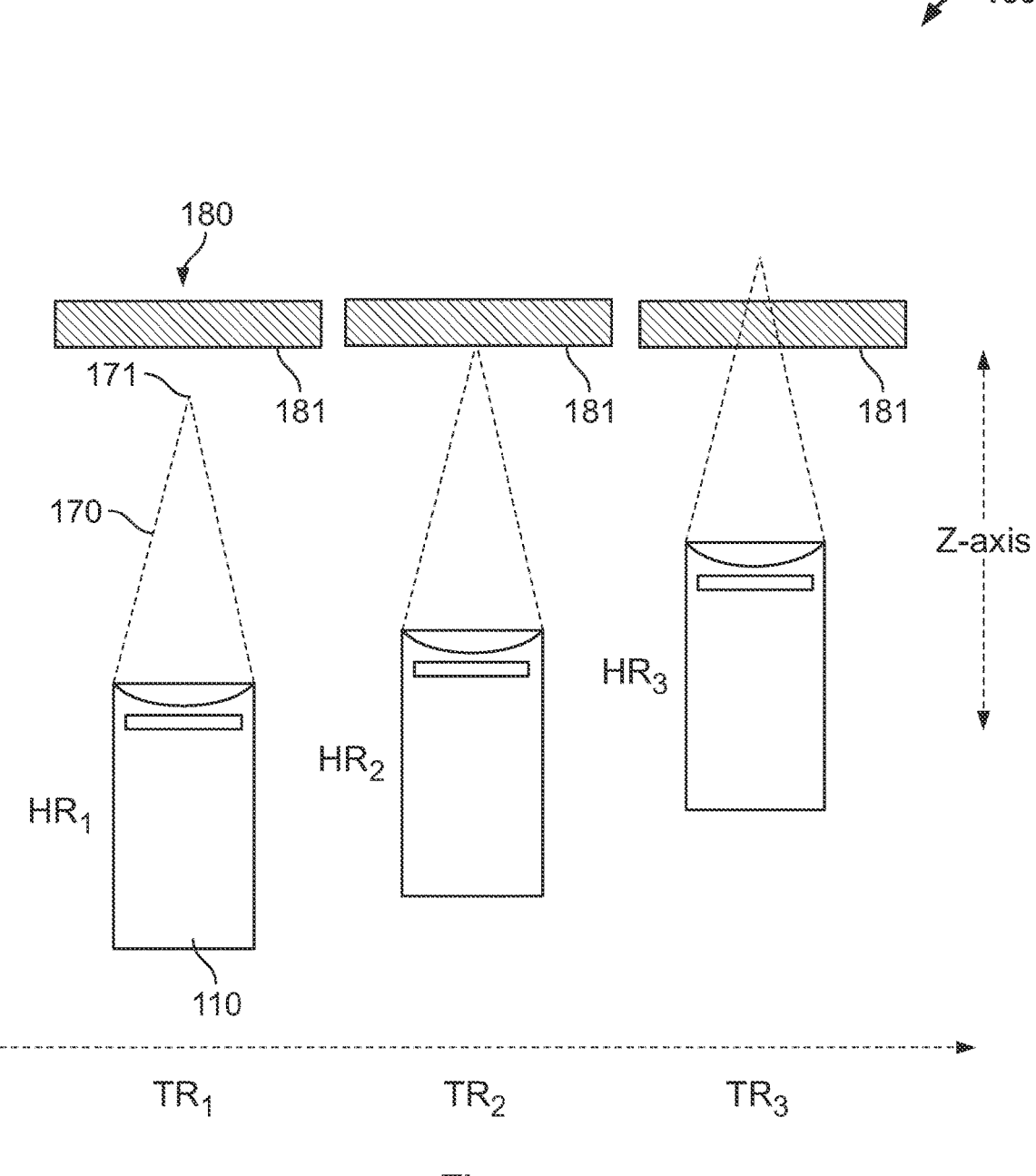
FIG. 7 shows a representation of vertical movement of the transducer assembly and emitted acoustic radiation along the z-axis over time with respect to a reference object, according to certain embodiments.

FIG. 7 is similar to FIG. 6, but instead of a container 122, the transducer assembly 110 is underneath a reference object 180 during the sweep. In some embodiments, the reference object may be a flat plate. The reference object 180 is used to take reference measurements, as further described below. The reference object 180 may comprise a rigid material such as a metal (e.g., stainless steel), vitreous carbon, or fused quartz. The material properties of the reference object 180 can be known to the ADE system 100. The reference object 180 has a bottom surface 181.

At time $TR_1$, the transducer assembly 110 is positioned at z-position $HR_1$ such that the convergence point 171 is below the bottom surface 181 of the reference object 180. At time $TR_2$, the transducer assembly 110 is positioned at z-position $HR_2$, such that the convergence point 171 aligns with the bottom surface 181 of the reference object 180. At time $TR_3$, the transducer assembly 110 is positioned at z-position $HR_3$ such that the convergence point 171 is above the bottom surface 181. Although FIG. 7 shows three z-positions along the z-axis, the sweep may be performed at a different number of z-positions of the transducer assembly 110.

Each step in the sweeps shown in FIGS. 6 and 7 depicts an acoustic energy emission in the form of a beam 170. Each emission includes an acoustic signal in which the energy varies over time (an "emitted signal"). The frequency and/or the amplitude of the energy can vary over the duration of a given emitted signal. The emitted signals used during the sweep do not cause droplets to be ejected from a sample 101. However, the emitted signals used during the sweep may have a similar or identical frequencies as those in emitted signals used during the phase in which droplets 102 are ejected from the samples 101. For example, each emitted signal during the sweep may use the same, constant frequency. The selected frequency may depend on the type of sample 101 and intended transfer volume as described in U.S. Pat. No. 10,156,499, which is incorporated herein by reference in its entirety. To prevent or limit liquid ejection, the emitted signals during sweeps may be shorter and have a lower amplitude (less energy) than those used to eject droplets 102.

Some of the emitted energy is reflected back to the transducer 112 in the form of a reflected acoustic signal (a "reflected signal"). Generally, acoustic energy is reflected at interfaces between different media. In the case of acoustic energy emitted towards a container 122 and sample 101 (see FIG. 6), these interfaces are: (1) coupling liquid 160 and the lower surface 121 of the container bottom wall 124; (2) upper surface 123 of the of the container bottom wall 124 and the sample 101; and (3) top of the sample 103 and the air above. For simplicity, the first interface will be referred to as the bottom wall lower surface 121. The second interface will be referred to as the bottom wall upper surface 123. The third interface will be referred to as the free surface of the sample 103.

Figure 8:
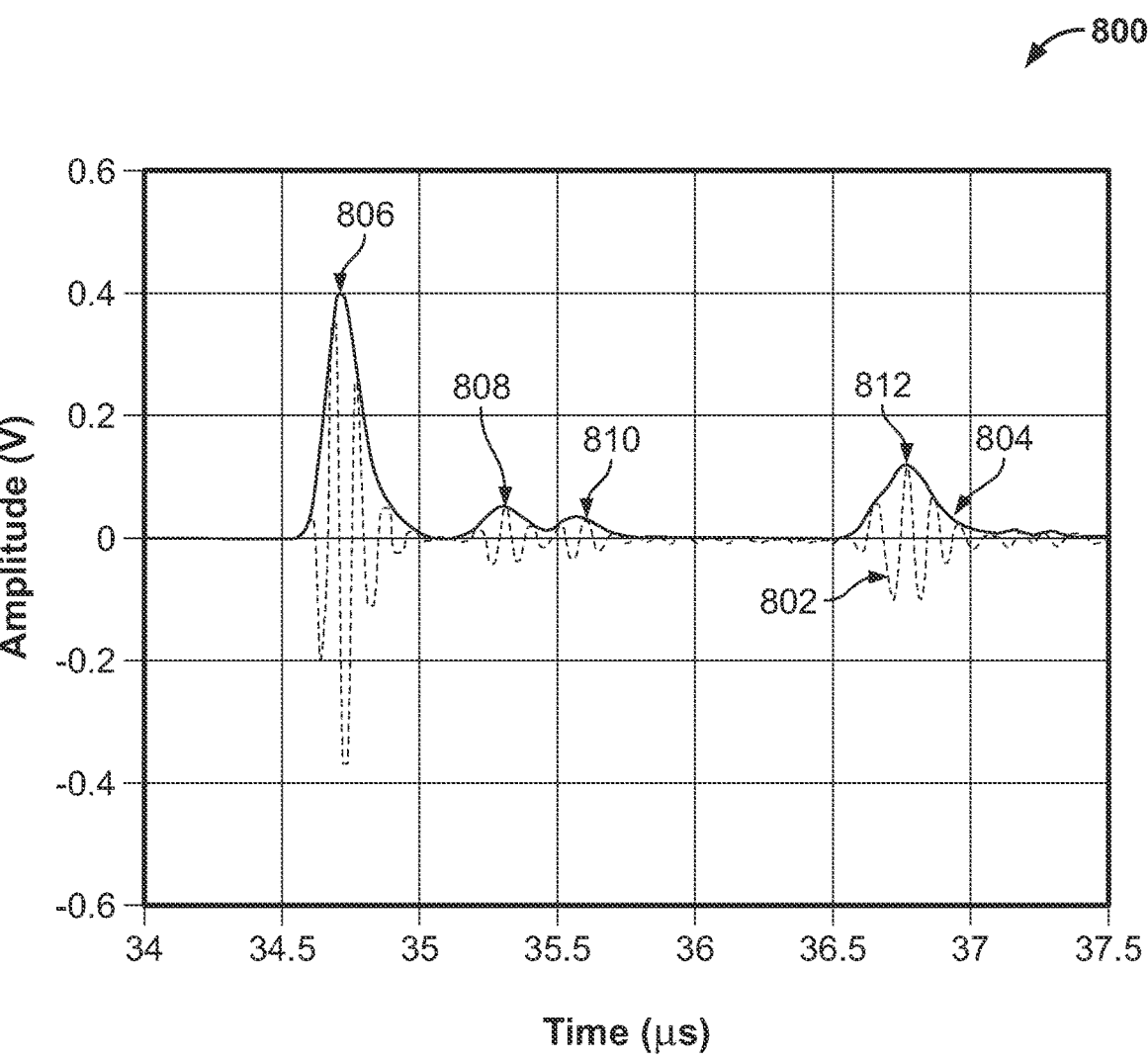
FIG. 8 is a graph of an acoustic signal reflected from a container and sample.

FIG. 8 is a graph 800 illustrating a single reflected signal 802 received in response to a single emitted signal. The x-axis shows the time after the emitted signal was emitted, and the y-axis shows the strength of the reflected signal 802 (which is referred to as the "amplitude" in the y-axis label). The y-axis indicates the amplitude of the reflected signal 802 at any given time in terms of voltage (V). This is the voltage across the electrical terminals of the transducer 112 (or a voltage that corresponds to a measured voltage at the terminals of the transducer 112). The reflected signal 802 can define an envelope 804. As depicted, the envelope 804 outlines the extremes of the reflected signal 802.

The envelope 804 has four distinct peaks corresponding to four different reflections or "echoes" from media interfaces. Peak 806 corresponds to an echo from the bottom wall lower surface (numbered 121 in FIG. 6) and is referred to herein as BB, which is an abbreviation for "bottom of bottom" time of flight. Peaks 808 and 810 both correspond to echoes off the bottom wall upper surface (numbered 123 in FIG. 6). The reason for two echoes is that the emitted signal transmitted from the bottom wall lower surface 121 to the bottom wall upper surface includes two types of waves: longitudinal and shear. Peak 808 corresponds to the echo of the longitudinal wave off the bottom wall upper surface 123 is referred to herein as TBL (abbreviation for "top of bottom" time of flight of a longitudinal wave echo). Peak 810 corresponds to the echo of the shear wave off the bottom wall upper surface 123 that is reflected as a longitudinal wave back towards the transducer assembly 110, and is referred to as and TBS (abbreviation for "top of bottom" time of flight of a shear wave echo). To be clear, the TBS signal has both shear and longitudinal portions. The physics resulting in two separate echoes TBL and TBS from the same interface occurring at different times will be further discussed below. Peak 812 corresponds to an echo from the free surface 103 of the sample 101, and is referred to herein as SR (abbreviation for "surface reflection"). Each reflected signal 802 during the sweep may have the same BB, TBL, TBS, and SR peaks; however, the time and amplitude for the peaks will vary based on the z-position of the transducer assembly 110.

Figure 9:
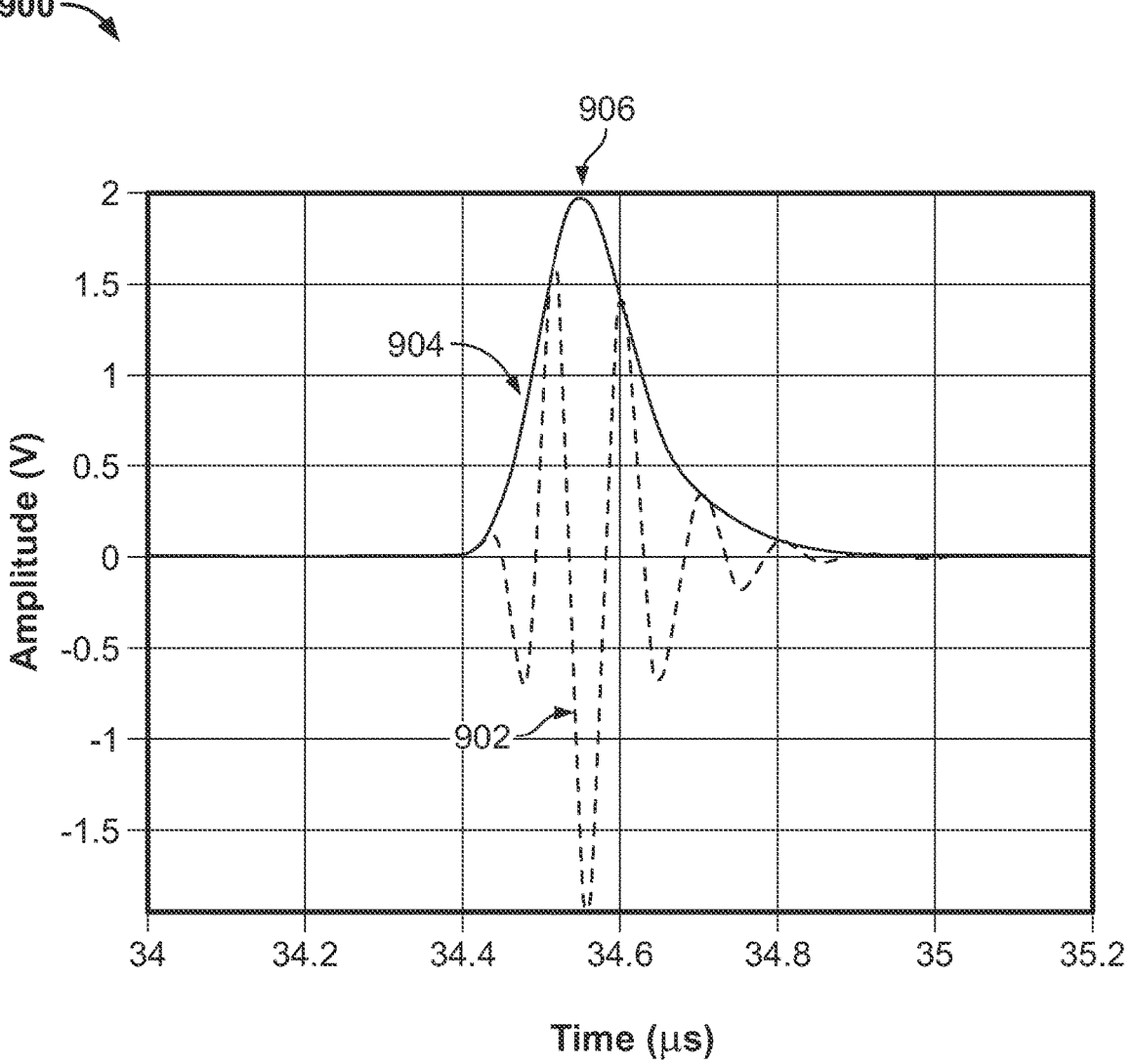
FIG. 9 is a graph of an acoustic signal reflected from a reference object.

FIG. 9 is similar to FIG. 8, but is a graph 900 of a reflected signal 902 reflected from the reference object 180 (see FIG. 7). The reflected signal 902 can define an envelope 904. Peak 906 in the envelope 904 correspond to an echo off the bottom surface 181 of the reference object 180.

Figure 10:
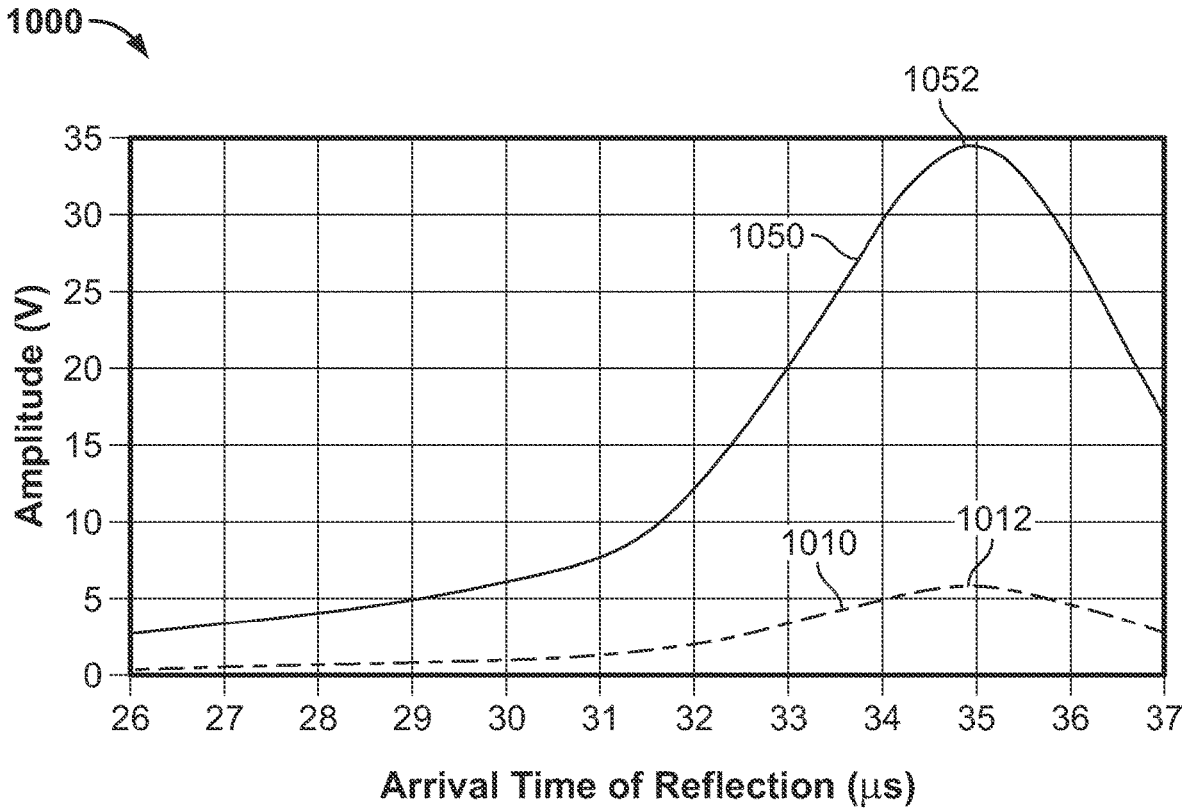
FIG. 10 is a BB-sweep curve for the bottom wall lower surface of a container and a reference-sweep curve for the bottom surface of the reference object.

FIG. 10 is a graph 1000 shows two different curves: a BB-sweep curve 1010 and a reference sweep curve 1050, each having peaks 1012 and 1052, respectively. Curves 1010, 1050 were generated from two different sweeps-curve 1010 was generated from one sweep 1010 and curve 1050 was generated from a different sweep. The peak 1012 is referred to herein as the BB-sweep curve peak 1012, and it effectively indicates the z-position of the bottom wall lower surface 121. The peak 1052 is referred to as the reference-sweep curve peak 1052, and it effectively indicates the z-position of the bottom surface 181 of the reference object 180.

The BB-sweep curve 1010 is generated from data from a single sweep. Unlike the sweep shown in FIG. 6 in which the transducer has five z-positions, the sweep used to generate curve 1010 included many more transmissions at different z-positions. At each z-position, a signal is emitted by the transducer 112 and reflected. The x-axis of graph 1000 shows the ToF (time of flight), which indicates the distance between the transducer 112 and the bottom wall lower surface 121. More specifically, the ToF indicates the time between the emitted signal and the reflected signal, which can then be used to determine distance. The y-axis shows the amplitude of the BB peaks 806. The BB-sweep curve peak 1012, then, indicates the z-position of the bottom wall lower surface 121. More particularly, the BB-sweep curve peak 1012 indicates the distance between the transducer 112 and the bottom wall lower surface 121 when the convergence point 171 aligns with the bottom wall lower surface 121, as shown in FIG. 6 at time $T_2$.

The reference sweep 1050 is generated similarly to the BB sweep curve 1010, except that the reference sweep curve 1050 results from reflections off of the bottom surface 181 of the reference object 180 (see BB peak 906 in FIG. 9). The reference-sweep curve peak 1052, then, indicates the distance between the transducer 112 and the bottom surface 181 of the reference plate when the convergence point 171 is aligned, as shown in FIG. 7 at time $TR_2$. Unlike the sweep shown in FIG. 7 in which the transducer has three z-positions, the sweep used to generate curve 1050 included many more transmissions at different z-positions.

Figure 11:
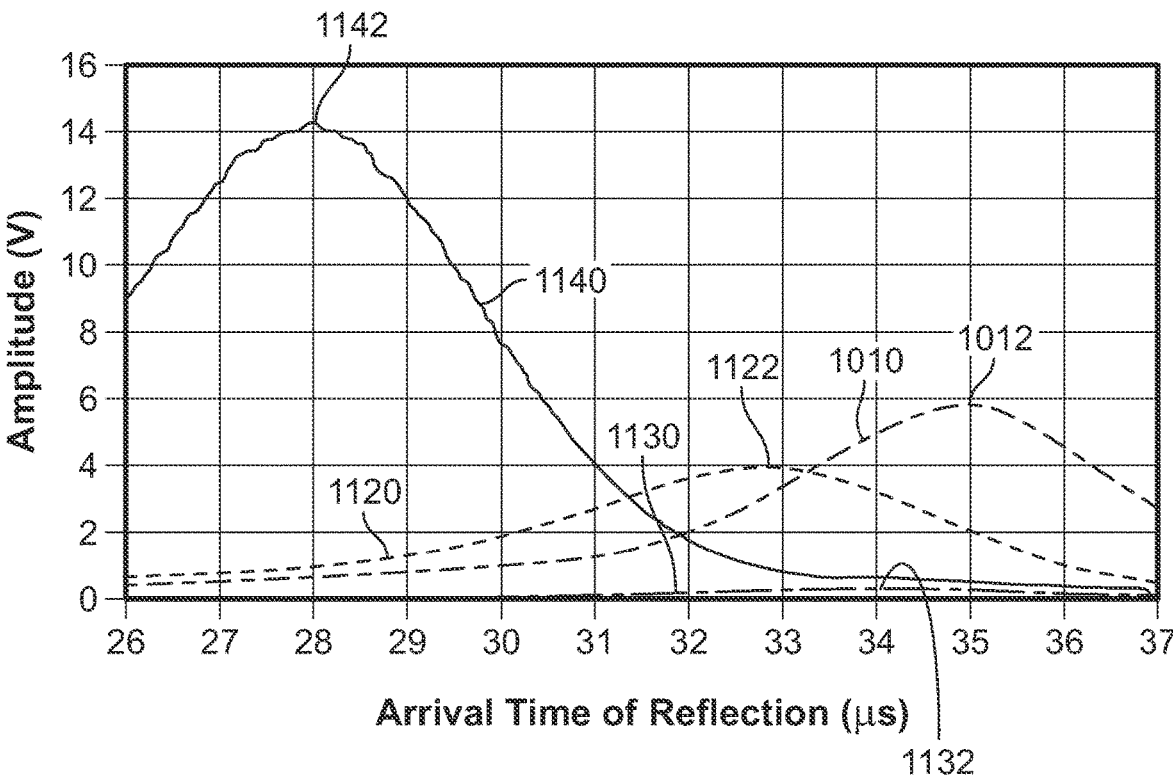
FIG. 11 shows the sweep BB curve for the bottom wall lower surface of a container bottom wall, a TBL-sweep curve and TBS-sweep curve for the upper surface of a container bottom wall, and a SR sweep curve for the free surface of a liquid sample.

FIG. 11 also shows the BB sweep curve 1010 of FIG. 10, as well as three other sweep curves: TBL-sweep curve 1120, a TBS-sweep curve 1130, and a SR-sweep curve 1140. Each of these curves can be generated from the same sweep or from separate or multiple sweeps. As with FIG. 10, the graph 1100 has an x-axis showing ToFs, which effectively indicate distances. The y-axis is also similar to that of FIG. 10, in that it indicates the intensity of the reflected signal.

Curves 1120, 1130, and 1140 are similar to BB sweep curve 1010. Each has its own peak: TBL-sweep curve peak 1122; TBS-sweep curve peak 1132; and SR-sweep curve peak 1142. Both the TBL-sweep curve peak 1122 and the TBS-sweep curve peak 132 indicate the distance along the z-axis between the transducer 112 and the bottom wall upper surface 123 of the container 122, except that TBL-sweep curve peak 1112 corresponds to the time of flight between the transducer 112 and the bottom wall upper surface 123 for a longitudinal wave, whereas TBS-sweep curve peak 1132 corresponds to the time of flight between the transducer 112 and the bottom wall upper surface 123 for a shear wave. SR-sweep curve peak 1142 indicates the distance along the z-axis between the transducer 112 and the free surface 103 of the sample 101.

Each of these peaks 1122, 1132, 1142, indicate the z-position of the transducer 112 when the convergence point 171 aligns with a material interface. TBL-sweep curve peak 1122 indicates when the convergence point 171 of a longitudinal wave aligns with the bottom wall upper surface 123 of the container 122, as depicted in FIG. 6 at time $T_3$. TBS-sweep curve peak 1132 indicates when the convergence point 171 of a shear wave aligns with the bottom wall upper surface 123 of the container 122, as depicted in FIG. 6 at time $T_4$. SR-sweep curve peak 1142 indicates when the convergence point 171 of a longitudinal wave aligns with the free surface 103 of the sample 101, as depicted in FIG. 6 at time $T_5$.

All of the curves in FIGS. 10 and 11 were generated using more emissions in a sweep than what is shown in FIGS. 6 and 7. The spacing between z-positions of the transducer 112 from emission-to-emission can be identical or can vary. In some embodiments, the system 100 may prevent the transducer 112 from emitting signals at z-positions that could result in reflected signal data that is not helpful. Such as z-positions could be positions where there is no expectation that the convergence point 171 and a media interface will align.

FIGS. 12A-12E illustrate geometries that occur during a sweep used for reference (FIG. 12A), and a sweep used to determine characteristics of the container 122 and the sample 101 (FIGS. 12B-12E). These figures define variables that will be used in the mathematical equations to follow.

Figure 12A:
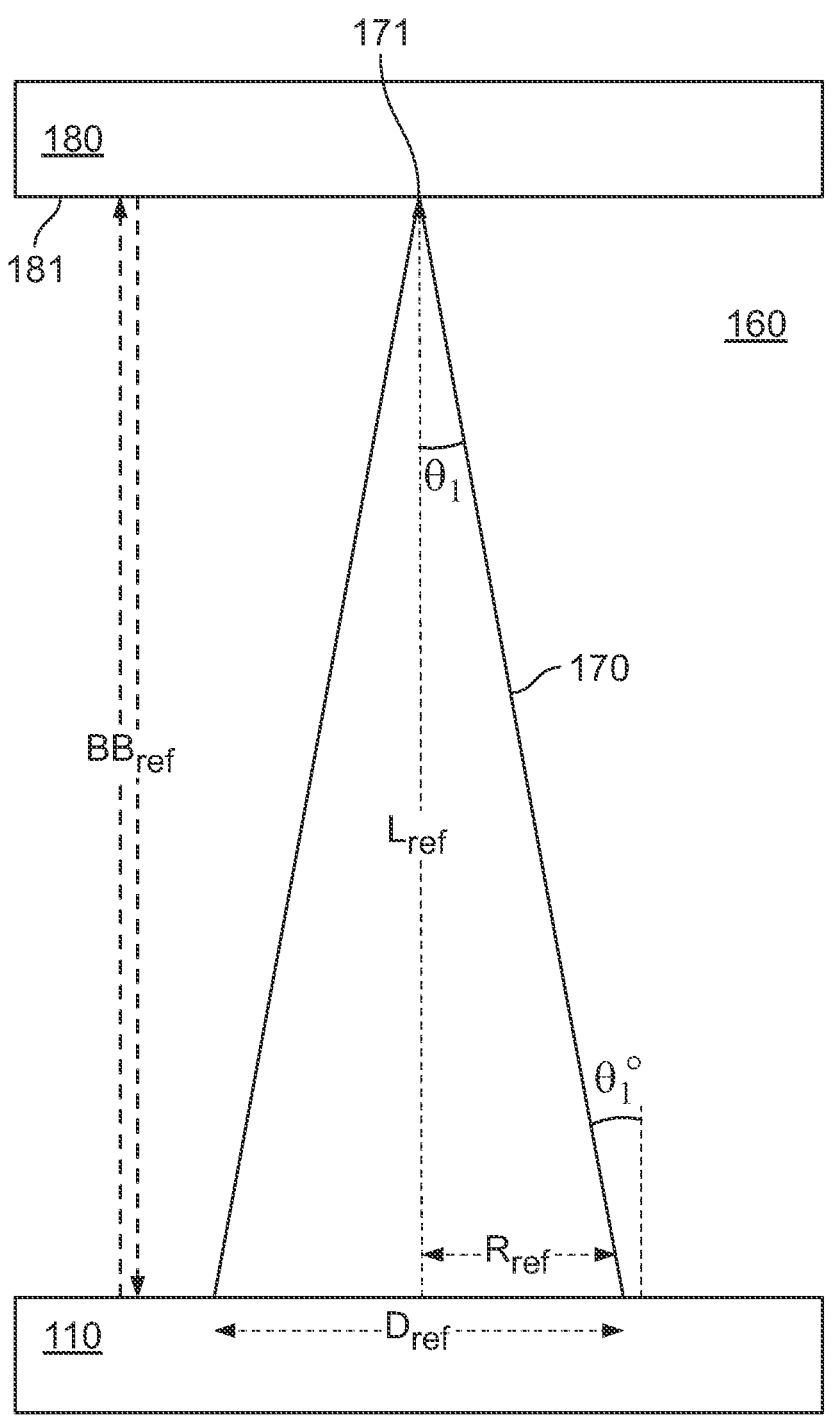
FIG. 12A shows a geometric representation of an acoustic beam focused on the bottom surface of the reference object.

FIG. 12A shows a geometric representation of an acoustic beam 170 emitted from the transducer assembly 110 and focused on the bottom surface 181 of the reference object 180. The transducer assembly 110 has a z-position at which the convergence point 171 aligns with the bottom surface 181 of the reference object 180 (as also shown in FIG. 7 at $HR_2$). The diameter and radius of the beam 170 at its base are labeled $D_{ref}$ and $R_{ref}$, respectively. The top surface of the transducer assembly 110 is located at a distance $L_{ref}$ from the bottom surface 181 of the reference object 180. The angle of the beam 170 (beam angle) is indicated as $\theta 1$ (and its inverse is indicated as $\theta°_1$). The time for acoustic energy to travel back and forth between the transducer assembly 110 and the bottom surface 181 is the time of flight as represented by $BB_{ref}$ (which is indicated by the reference-sweep curve peak 1052 of FIG. 10).

Figure 12B:
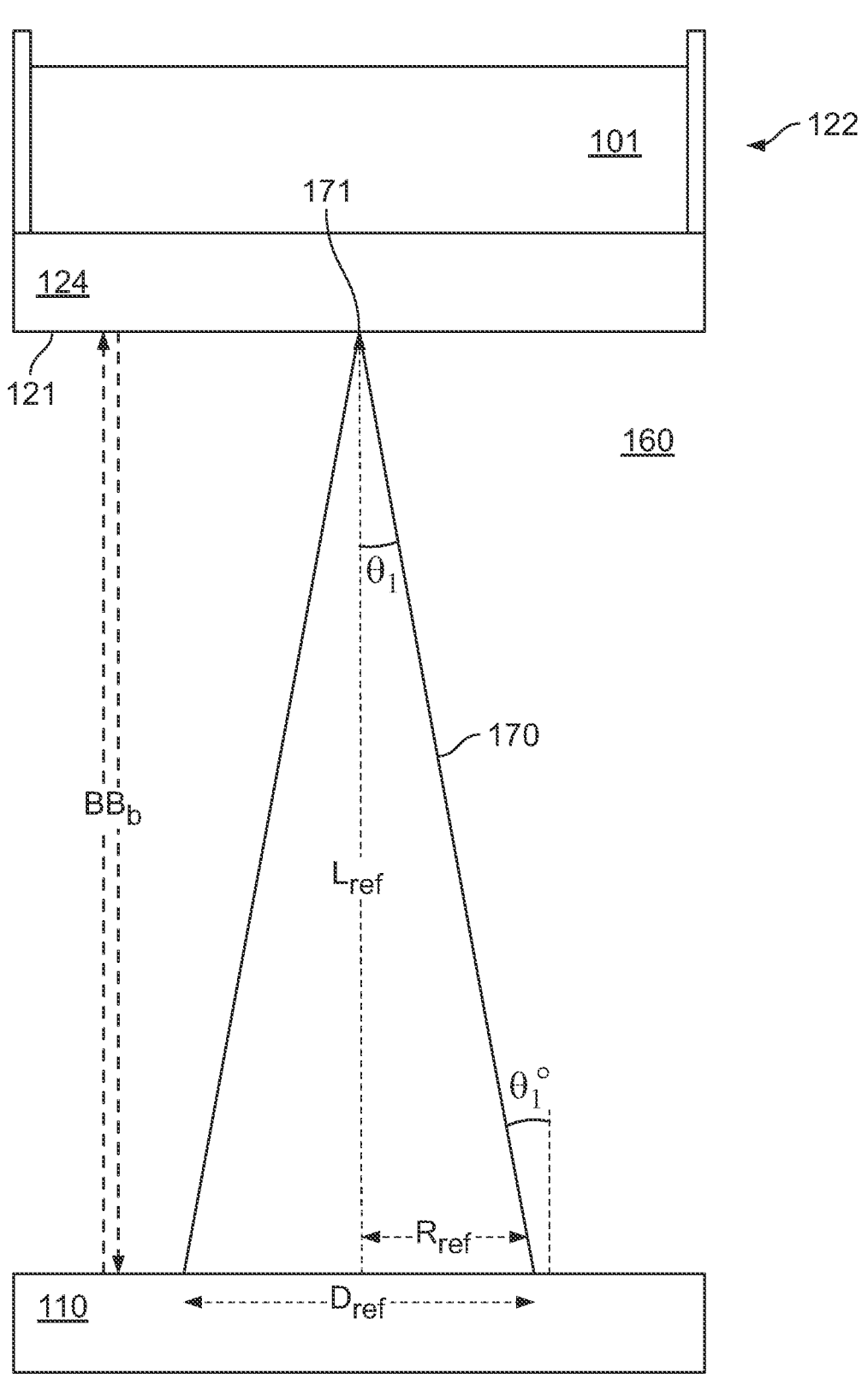
FIG. 12B-12E show geometric representations of acoustic beams focused at different locations of a container and sample during a sweep, according to certain embodiments.
Figure 12C:
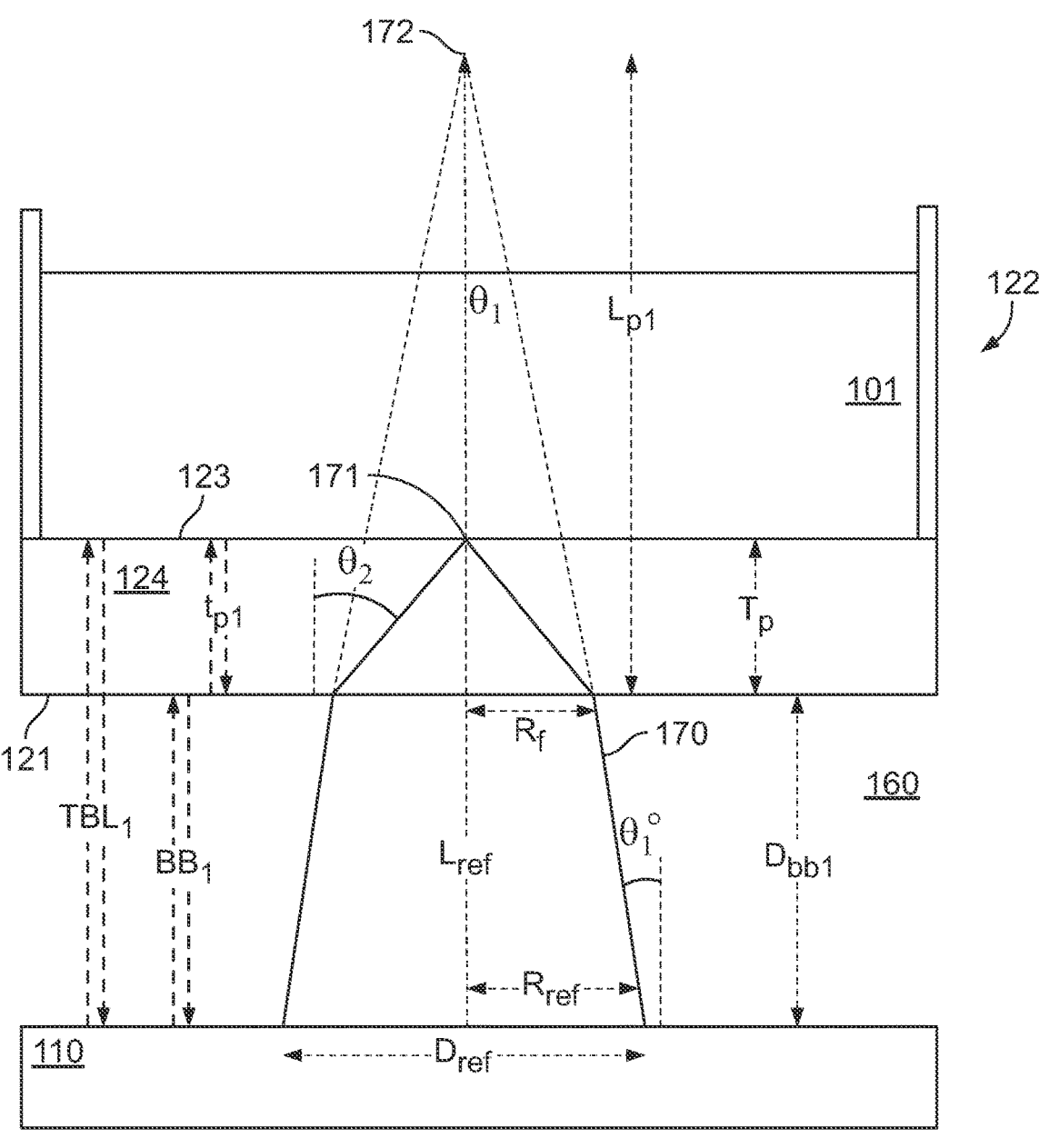
Figure 12D:
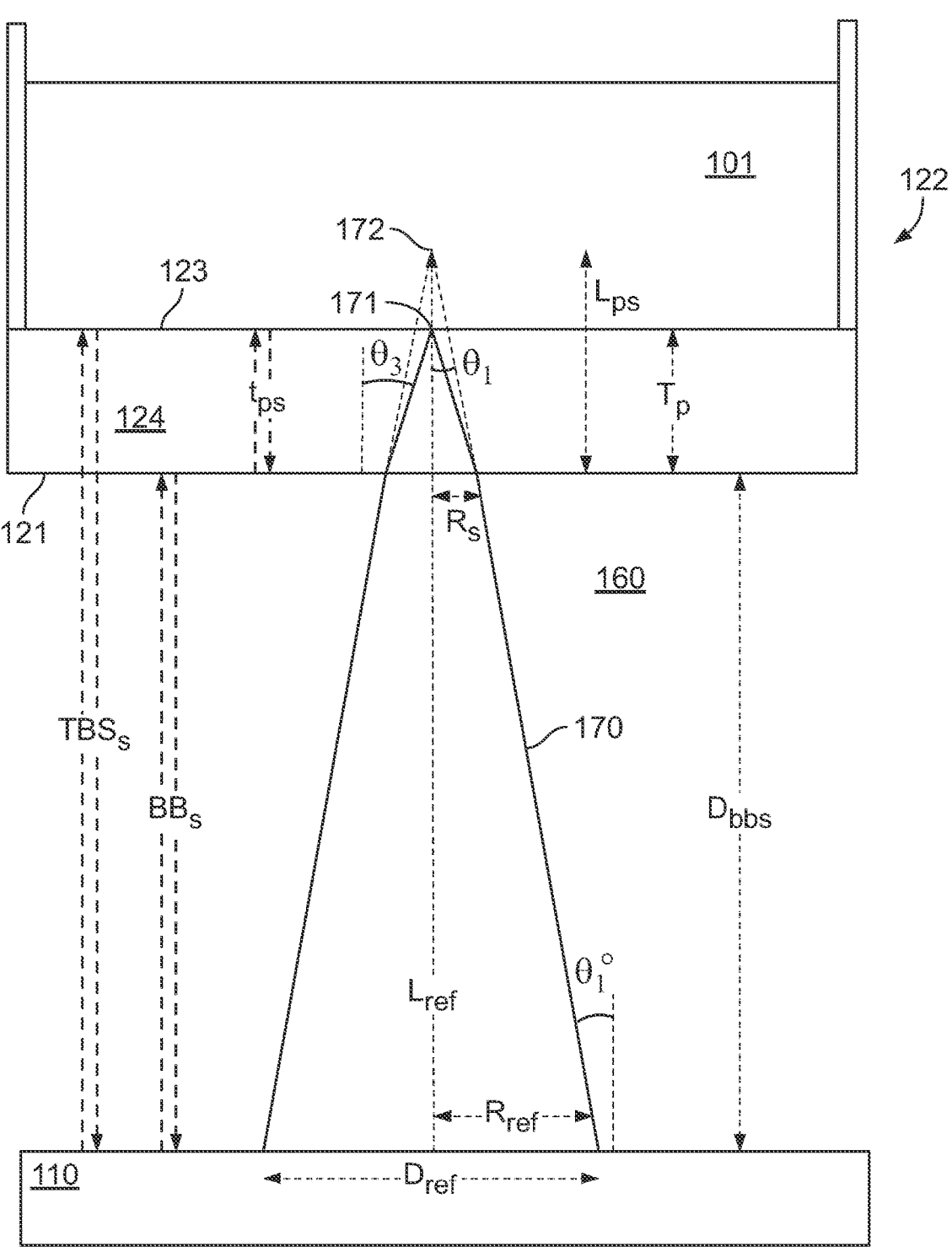
Figure 12E:
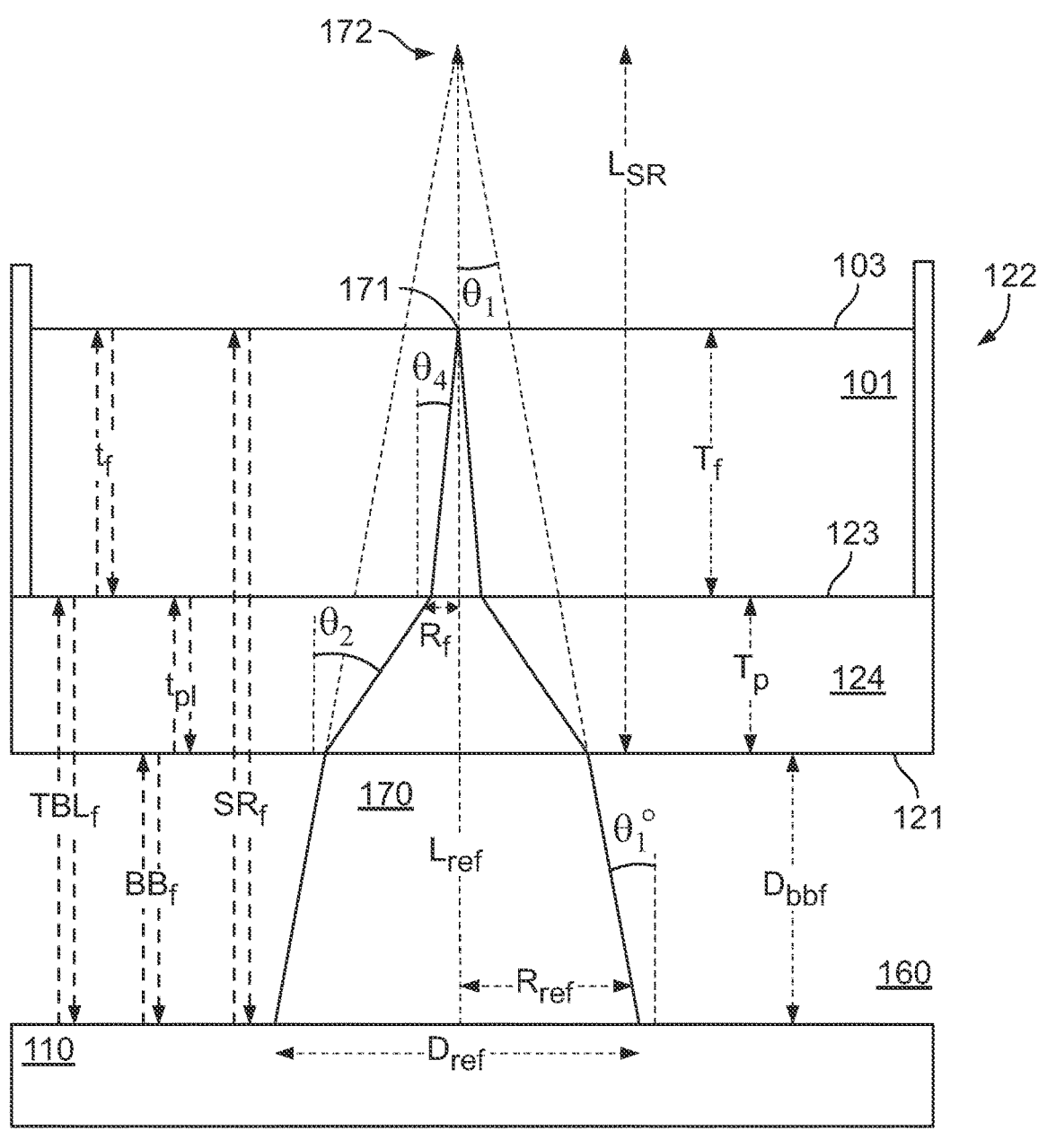

FIGS. 12B-12E illustrate different stages of one sweep of the transducer assembly 110 performed on a container 122, similar to the sequence shown in FIG. 6. In FIG. 12B, the convergence point 171 of the acoustic beam 170 aligns with the bottom wall lower surface 121. In both FIGS. 12C and 12D, the convergence point 171 of the acoustic beam 170 aligns with the bottom wall upper surface 123. In FIG. 12E, the convergence point 171 of the acoustic beam 170 aligns with the free surface 103 of the sample 101.

In FIG. 12B (which is similar to FIG. 12A), the acoustic beam 170 has a beam angle of $\theta_1$ and has a convergence point 171 at the bottom wall lower surface 121. FIG. 12B corresponds to z-position $H_2$ of FIG. 6 and the reflected signal corresponding to the BB-sweep curve peak 1012 of FIG. 10. The time for acoustic energy to travel back and forth between the transducer assembly 110 and bottom wall lower surface 121 is the time of flight as represented by $BB_b$.

FIGS. 12C and 12D are similar, in that both show positions where waveforms from the beam 170 converge to convergence points 171 at the upper surface 123 of the container bottom wall 124. FIG. 12C corresponds to the transducer assembly being located at z-position at $H_4$ of FIG. 6 and the reflected signal corresponding to the TBL-sweep curve peak 1122 of FIG. 11. FIG. 12D corresponds to the transducer assembly being located at z-position at $H_3$ of FIG. 6 and the reflected signal corresponding to the TBS-sweep curve peak 1132 of FIG. 11. As explained below, the z-positions in FIGS. 12C and 12D are slightly different. The focal point 172 is different than the convergence point 171. This difference is a result of the beam 170 crossing the container bottom wall 124. The focal point 172 is defined by $D_{ref}$ and $\theta_1$. In FIGS. 12C-12E, the difference in z-position between the convergence point 171 and the focal point 172 is due to the beam angle changing once the acoustic energy begins travelling through the thickness of the container bottom wall 124 as well as sample 101 in the case of FIG. 12E. Had the beam angle not changed, the convergence point 171 would have been coincident with the focal point 172 as shown by the dot-dash broken lines.

In general, the beam angle of an acoustic wave changes at the interface between two different media. In the case of FIGS. 12C and 12D, those different media are the container bottom wall 124 and the coupling liquid 160 below the container 122.

FIGS. 12C and 12D represent different types of acoustic wave transmission through the bottom wall of the container 122. FIG. 12C depicts a longitudinal wave transmission through the container bottom wall 124. That is, when the beam 170 enters the container bottom wall 124, a first portion of the acoustic energy from the beam 170 is transmitted through the material of the bottom wall of the container 122 as longitudinal waves, and this is depicted in FIG. 12C. Another portion of the acoustic energy is transmitted though the container bottom wall 124 as a shear wave, and FIG. 12D depicts this shear wave transmission. Longitudinal and shear waves behave differently. For example, longitudinal waves are faster than shear waves. Because of the difference in speed, the beam angles inside the container 122 are different: the beam angle $\theta_2$ in FIG. 12C (longitudinal wave) is greater than the beam angle $\theta_3$ shown in FIG. 12D (shear wave). This difference in beam angle necessitates that the z-position of the transducer assembly 110 be slightly different to allow for convergence at the bottom wall upper surface 123 corresponding to the slight differences of the z-position $H_3$ and $H_4$ of FIG. 6. FIGS. 12C and 12D are not illustrated to scale. For example, in some embodiments, there is only a 5% change in z-position of the transducer between FIGS. 12C and 12D (e.g., $D_{bbs}$ may be 5% larger than $D_{bbl}$).

FIGS. 12C and 12D also show the time for acoustic energy to travel between multiple surfaces. For FIG. 12C, the time for acoustic energy to travel back and forth between the transducer assembly 110 and the bottom wall lower surface 121 as well as the bottom wall upper surface 123 are represented by $BB_l$ and $TBL_l$ respectively. The reflected signal (similar to FIG. 8) corresponding to the TBL-sweep curve peak 1122 provides the time of flight values for $BB_l$ and $TBL_l$. Similarly, for FIG. 12D, the time for acoustic energy to travel back and forth between the transducer assembly 110 and the bottom wall lower surface 121 as well as the bottom wall upper surface 123 are represented by $BB_s$ and $TBS_s$ respectively. The reflected signal corresponding to the TBS-sweep curve peak 1132 provides the time of flight values for $BB_s$ and $TBS_s$.

FIG. 12E depicts a beam 170 of longitudinal waves. FIG. 12E corresponds to z-position $H_4$ of FIG. 6 and the SR-sweep curve peak 1142 of FIG. 11. As with FIG. 12C, the focal point 172 would be located above the bottom wall upper surface 123 and may also be located above the sample free surface 103. Similar to 12C, the beam angle changes from $\theta_1$ in the coupling liquid 160 to $\theta_2$ in the container 122. As the beam 170 continues past the bottom wall upper surface 123 and into the sample liquid 101, the beam angle changes again to $\theta_4$. Again, this change is due to another interface between different media in this case, the container bottom wall 124 and the sample 101.

For FIG. 12E, the time for acoustic energy to travel back and forth between the transducer assembly 110 and the bottom wall lower surface 121 as well as the bottom wall upper surface 123 are represented by $BB_f$ and $TBL_f$ respectively. The time for acoustic energy to travel back and forth between the transducer assembly 110 and the sample free surface 103 is represented by $SR_f$. The reflected signal corresponding to the SR-sweep curve peak 1142 provides the time values for $BB_f$, $TBL_f$ and $SR_f$.

FIGS. 12A-12E illustrate some additional geometric relationships. These are: $D_{bbt}$(see FIG. 12C), $D_{bbs}$ (see FIG. 12D), and $D_{bbf}$ (see FIG. 12E), which are the distances between the transducer assembly 110 and the bottom wall lower surface 121 at positions $H_4$, $H_3$, and $H_5$, respectively; $T_p$ (see FIGS. 12C-12E), which is the thickness of the container bottom wall 124; $L_{pl}$ (see FIG. 12C), $L_{ps}$ (see FIG. 12D), and $L_{SR}$ (see FIG. 12E) which are the vertical distance between the bottom wall lower surface 121 and the focal point 172; $R_l$ (see FIG. 12C) and $R_s$ (see FIG. 12D), which are the radius of the beam 170 at the bottom wall lower surface 121 when the convergence point 171 is at the bottom wall upper surface 123; $R_f$ (see FIG. 12E), which is the radius of the beam 170 at the bottom wall upper surface 123 when the convergence point 171 is at the sample free surface 103.

FIGS. 12C-12E also illustrate the time it takes for sound to travel back and forth between additional portions of the system. These times include: $t_{pl}$ (see FIGS. 12C and 12E) and $t_{ps}$ (see FIG. 12D) are the transit time for the signal passing through the entering to exiting the container bottom surface 121 after reflecting off the bottom wall upper surface 123; and $t_f$ (see FIG. 2E) is the time signal from entering to exiting the bottom wall upper surface 123 after reflecting off the free surface 103.

As will be further described below, the aforementioned geometries and principles shown in FIGS. 12A-12E can be used in combination with the methods illustrated in FIGS. 6 and 7, along with the measurements of the reflected signal shown in FIGS. 8-11 to determine certain characteristics of the sample.

The processor 143 can control operation of the system 100 and receive data as discussed above in order to determine one or more characteristics of the sample 101 and the container 122 using the techniques described below. The characteristics of the sample 101 include the sound speed $v_f$ (i.e., the speed at which sound travels through the sample 101), the depth $T_f$ of the sample 101, and the acoustic impedance $Z_f$. The characteristics of the container bottom wall 124 include longitudinal sound speed $v_{pl}$, the shear sound speed $v_{ps}$, the thickness of the container bottom wall $T_p$, and the acoustic impedance $Z_p$.

Additionally, the system can determine the speed of sound $v_w$ for the coupling liquid 160 based on the temperature of the coupling liquid 160 measured at the temperature sensor by the temperature sensor circuitry 141 and the properties known based on the type of coupling liquid 160. Similarly, the system can determine the density of the air $\rho_a$ and speed of sound of the air $v_a$ based on the temperature of the air above the container 122 at the temperature sensor by the temperature sensor circuitry 141 and the known properties of air.

Longitudinal Sound Speed in the Container and Thickness of the Container Bottom Wall The longitudinal speed of sound $v_{pl}$ in the container 122 and its thickness $T_p$ can be determined simultaneously.

Initially, the distance $L_{ref}$ can be determined based on (1) the time of flight $BB_{ref}$ of sound traveling back and forth through the coupling liquid 160 between the transducer assembly 110 and the reference object bottom surface 181 (see FIG. 12A), and (2) $v_w$, which is the speed of sound in the coupling liquid 160. The speed of sound $v_w$ in the coupling liquid can be determined based its temperature and other known characteristics. Once these values are determined, $L_{ref}$ can be solved for as shown in Eq. 1:

$$v_w = \frac{\text{distance}}{\text{time}} = \frac{2L_{ref}}{BB_{ref}} \Rightarrow L_{ref} = \frac{v_w BB_{ref}}{2} \qquad \text{Equation 1}$$

Next, $\theta_1$ (and therefore its inverse $\theta_1°$) can be calculated based on (1) $L_{ref}$, (2) $R_{ref}$ (which is known based on the shape of the beam 170 emitted from the transducer assembly 110), and an angular correction term $\phi$. The angular correction term $\phi$ takes into account the difference between $D_{ref}$ and the diameter of the transducer assembly 110 at the top surface of acoustic lens 113 as shown in FIG. 2A. $\phi$ can be determined in advance. Then, $\theta_1$ can be solved for as shown in Eq. 2:

$$\tan\theta_1 = \frac{opp}{adj} = \frac{R_{ref}}{L_{ref}} \Rightarrow \theta_1 = \tan^{-1}\left(\frac{R_{ref}}{L_{ref}}\right) + \phi, \qquad \text{Equation 2}$$

Next, the container bottom wall thickness $T_p$ and the longitudinal speed of sound $v_{pl}$ in the container 122 are calculated based on the relationships of FIGS. 12A and 12C. The container bottom wall thickness $T_p$ is the vertical distance between of the bottom wall lower surface 121 and the bottom wall upper surface 123. The longitudinal speed of sound $v_{pl}$ is the speed at which longitudinal sound waves travel through the bottom wall of the container 122. For subsequent calculations, the system processor 143 also uses an additional equation based on Snell's law.

$$\frac{v_{pl}}{v_w} = \frac{\sin\theta_2}{\sin\theta_1}, \qquad \text{Equation 3}$$

Generally, Snell's law relates the speed of a wave and the angle of incidence through one media to the speed of the wave and resulting angle of refraction in a second media. As such, Snell's law relates the transmitted signal 170 as it passes through the coupling liquid 160 at the corresponding beam angle $\theta_1$ up to the bottom wall lower surface 121 as compared to the to the deflected signal passing through the container 122 at the transmission angle $\theta_2$. As is shown in FIG. 12C, the transmission angle $\theta_2$ is larger than the beam angle $\theta_1$. This is a result of the container well longitudinal speed of sound $v_{pl}$ being greater than the coupling liquid speed of sound $v_w$.

Next, the container longitudinal speed of sound $v_{pl}$ is solved for. Initially, the transit time $t_{pl}$ is calculated based on the difference between the measured top of bottom time of flight $TBL_l$ and bottom of bottom time of flight $BB_l$ (see FIG. 12C). The container bottom wall thickness $T_p$ remains an unknown value; however, the container longitudinal speed of sound $v_{pl}$ is solved for as shown in Eq. 4:

$$v_{pl} = \frac{\text{distance}}{\text{time}} = \frac{2T_p}{TBL_l - BB_l} = \frac{2T_p}{t_{pl}} \qquad \text{Equation 4}$$

Next, the container longitudinal beam radius $R_1$ is solved for. Initially, the container bottom distance $D_{bbl}$ can be determined based on the speed of sound $v_w$ of the coupling liquid 160, the bottom of bottom time of flight $BB_l$, and Equation 1. Next, $L_{pl}$ is solved for as the difference between $L_{ref}$ and $D_{bbl}$ (see FIG. 12C). Then $R_1$ can be solved for based on relationship between $\theta_1$, $R_l$, and $L_{pl}$ (see FIG. 12C) as shown in Eq. 5.

$$\tan\theta_1 = \frac{opp}{adj} = \frac{R_l}{L_{pl}} \Rightarrow R_l = L_{pl}\tan\theta_1, \qquad \text{Equation 5}$$

Sin $\theta_2$ can also be solved. The spatial relationship between $\theta_2$, $R_1$, and $T_p$ (see FIG. 12C) results in Eq. 6.

$$\sin\theta_2 = \frac{opp}{hyp} = \frac{R_l}{\sqrt{R_l^2 + T_p^2}}, \qquad \text{Equation 6}$$

Finally, $T_p$ can be solved for. At this point, $v_{pl}$, sin $\theta_2$, $\theta_1$, $R_1$ have been solved for. Additionally, $\phi$ and $v_w$ are known. Applying Snell's law from Eq. 3, and substituting the known values and variables results in Eq. 7 that can be solved numerically for the thickness of the bottom wall of the container $T_p$:

$$\frac{2T_p}{v_w t_{pl}} = \frac{L_{pl}\tan(\theta_1 + \phi)}{\sin(\theta_1 + \phi)\sqrt{(L_{pl}\tan(\theta_1 + \phi))^2 + T_p^2}}. \qquad \text{Equation 7}$$

The container longitudinal sound speed $v_{pl}$ can be solved numerically at this point. $T_p$ and $t_{pl}$ can be applied to Eq. 4 to calculate a value of $v_{pl}$.

Shear Sound Speed in the Container and Thickness of the Container Bottom Wall

The shear speed of sound $v_{ps}$ in the container 122 and container bottom wall thickness $T_p$ can also be determined based on the relationships of FIGS. 12A and 12D.

First, the container shear sound speed $v_{ps}$ is solved for. Initially, the transit time $t_{ps}$ is calculated based on the difference between the measured top of bottom time of flight of the shear wave echo $TBS_S$ and bottom of bottom time of flight $BB_S$ (see FIG. 12D). In FIG. 12D, a shear wave component of the acoustic beam propagates through the container bottom wall and results in a reflection of a longitudinal wave from the top of the container bottom wall toward the bottom of the container bottom wall. The transit time $t_{ps}$ corresponds to the total time for this entry, propagation, and reflection within the container bottom wall. To be clear, the transit time $T_{ps}$ of FIG. 12D is made up of a one-way shear signal and one-way longitudinal signal. The shear sound speed $v_{ps}$ is a function of both the transit time $t_{psl}$ and the longitudinal time delay $t_{pl}$ as given in Eq. 4. The container bottom wall thickness $T_p$ is treated as an unknown value even though it was previously calculated in Eq. 7. The container shear speed of sound $v_{ps}$ is solved for as shown in Eq. 8:

$$v_{ps} = \frac{T_p}{t_{ps} - t_{pl}/2}, \qquad \text{Equation 8}$$

Snell's law is applied to FIG. 12 D to become Eq. 9:

$$\frac{v_{ps}}{v_w} = \frac{\sin\theta_3}{\sin\theta_1}, \qquad \text{Equation 9}$$

The container shear beam radius $R_s$ can be solved for. Initially, the shear container bottom distance $D_{bbs}$ can be determined based on the speed of sound $v_w$ of the coupling liquid 160, the bottom of bottom time of flight $BB_s$, and Equation 1. Next, $L_{ps}$ is solved for as the difference between $L_{ref}$ and $D_{bbs}$ (see FIG. 12D). Then $R_s$ can be solved for based on relationship between $\theta_1$, $R_s$, and $L_{ps}$ (see FIG. 12D) as shown in Eq. 10:

$$\tan\theta_1 = \frac{opp}{adj} = \frac{R_s}{L_{ps}} \Rightarrow R_s = L_{ps}\tan\theta_1, \qquad \text{Equation 10}$$

Sin $\theta_3$ can also be solved for. The spatial relationship between $\theta_3$, $R_s$, and $T_p$ (see FIG. 12D) results in Eq. 11:

$$\sin\theta_3 = \frac{opp}{hyp} = \frac{R_s}{\sqrt{R_s^2 + T_p^2}}, \qquad \text{Equation 11}$$

Finally, $T_p$ can be solved for a second time. At this point, $v_{ps}$, sin $\theta_3$, angle $\theta_1$, $R_s$ have been solved for. And, $\phi$ and $v_w$ are still known. Applying Snell's law from Eq. 9, and substituting the known values and variables results in Eq. 12 that can be solved numerically for the thickness of the bottom wall of the container $T_p$:

$$\frac{T_p}{v_w\left(t_{ps} - \frac{t_{pl}}{2}\right)} = \frac{L_{ps}\tan(\theta_1 + \phi)}{\sin(\theta_1 + \phi)\sqrt{(L_{ps}\tan(\theta_1 + \phi))^2 + T_p^2}}, \qquad \text{Equation 12}$$

The values for $T_p$ from solving Eqs. 7 and 12 should be equal as they both measure the thickness $T_p$ of the container bottom wall 124. However, the calculation of $v_{pl}$ in Eq. 4 is sensitive to the values used for $TBL_l$ and $BB_l$ corresponding to the specific reflected signal selected for the TBL-sweep curve peak 1122. Similarly, the calculation of $v_{ps}$ in Eq. 8 is sensitive to the values for $TBS_s$ and $BB_s$ corresponding to the specific reflected signal selected for the TBS-sweep curve peak 1132. By separately calculating both $T_p$ based on $v_{pl}$ as well as based on $v_{ps}$, an iterative process can be used to determine the specific reflected signal for the respective TBL-sweep curve peak 1122 and TBS-sweep curve peak 1132 and their corresponding time of flight values that result in the closest values of $T_p$ for both sets of equations.

Sound Speed in the Liquid and Depth of the Sample

With the calculations for the container 122 complete, the speed of sound $v_f$ of the sample 101 and depth $T_f$ of the sample 101 can be determined. The difference between $SR_f$ and $TBL_f$ provide a liquid transit time $t_f$. $T_f$ is used as a variable. The relationship between $T_f$ and $t_f$ in FIG. 12E provides the following Eq. 13:

$$v_f = \frac{distance}{time} = \frac{2T_f}{SR_f - TBL_f} = \frac{2T_f}{t_f}, \qquad \text{Equation 13}$$

$T_f$ and $\theta_4$ further can be determined with previously calculated values. Specifically, $T_p$, $\theta_1$, and $\theta_2$. Additionally, $L_{SR}$ can be calculated based on $D_{bbf}$ and $v_w$ similar to before. Similarly, $v_f$ can be calculated by using Snell's law. Because $v_w$, $v_{pl}$, $\theta_1$, and $\theta_2$ have all been calculated, $T_f$ and $v_f$ can be calculated numerically using Applying the relationships of FIG. 12E results in Eqs. 14 and 15:

$$T_f = \frac{L_{SR}\tan\theta_1 - T_p\tan\theta_2}{\tan\theta_4}, \qquad \text{Equation 14}$$

$$\frac{\sin\theta_1}{v_w} = \frac{\sin\theta_2}{v_{pl}} = \frac{\sin\theta_4}{v_f}, \qquad \text{Equation 15}$$

Although these calculations as described above identify specific measured values and corresponding calculations. One skilled in the art would recognize other similar calculations based on similar or equivalent measurement points or equations based on the geometry established by the system during the sweep and the corresponding reflected signals as shown in FIGS. 12A-E.

Acoustic Impedances of the Container and Sample

The acoustic impedances of the container bottom wall 124 and sample 101 are calculated. The reference-sweep curve peak 1052 and BB-sweep curve peak 1012 of FIG. 10 as well as the TBL-sweep curve peak 1122 and SR-sweep curve peak 1142 of FIG. 11 are used to calculate the corresponding impedance values for both the container bottom wall 124 and sample 101. A pressure reflection coefficient R to relates an acoustic impedance of a first interface $Z_1$ with the acoustic impedance of a second interface $Z_2$ in which the sound wave reflects at the interface between the first interface and the second interface. The pressure reflection coefficient R can be related as Eq. 16:

$$R = \frac{Z_2 - Z_1}{Z_2 + Z_1}, \qquad \text{Equation 16}$$

A pressure transmission coefficient T to relates an acoustic impedance of a first interface $Z_1$ with the acoustic impedance of a second interface $Z_2$ when the sound wave passes through the interface between the first interface and the second interface. The pressure reflection coefficient T can be related as Eq. 17:

$$T = \frac{2Z_2}{Z_2 + Z_1}, \qquad \text{Equation 17}$$

The acoustic impedances of materials with a known density p and a known sound speed v based on Eq. 18:

$$Z = \rho v \qquad \text{Equation 18}$$

The impedance $Z_w$ of the coupling liquid 160 again using the temperature sensor circuitry 141 to determine the temperature of the coupling liquid 160 to determine the coupling liquid density $\rho_w$ and coupling liquid sound speed $v_w$ for a known coupling liquid 160. Similarly, the system processor 143 calculates the impedance $Z_a$ of the air space above the sample 101 using the corresponding temperature detected by the temperature sensor circuitry 141 and a corresponding air density $\rho_a$ and air sound speed $v_a$. Additionally, the system processor 143 also has stored values corresponding to the impedance $Z_{ref}$ of the reference object 180 based on the reference object being made of a known material.

An initial sound pressure $p_0$ is calculated. REF comes from the amplitude of the reference-sweep curve peak 1052 of FIG. 10. By using $Z_{ref}$, $Z_a$, REF, and Eq. 16, the interface between the coupling liquid 160 and the reference object of FIG. 12A, can be expressed as Eq. 19:

$$REF = p_0 \frac{Z_{ref} - Z_w}{Z_{ref} + Z_w}, \qquad \text{Equation 19}$$

The initial sound pressure $p_0$ is solved for as Eq. 20:

$$p_0 = REF \frac{Z_{ref} + Z_w}{Z_{ref} - Z_w}, \qquad \text{Equation 20}$$

Next, the container impedance $Z_p$ is solved for. $Z_w$ and $p_0$ remain the same. The amplitude of the BB-sweep curve peak 1012 of FIG. 11 provides $p_{BB}$. And FIG. 12B provides the physical relationship. $Z_p$ can be numerically solved with the Eq. 21:

$$p_{BB} = p_0 \frac{Z_p - Z_w}{Z_p + Z_w}, \qquad \text{Equation 21}$$

Similarly, the sample impedance $Z_f$ is calculated. $Z_p$, $Z_w$, and $p_0$ remain the same as above. The amplitude of the TBL-sweep curve peak 1122 of FIG. 11 provides $p_{TB}$. FIG. 12C provides the physical relationship. $Z_f$ can be numerically solved with the Eq. 22

$$p_{TB} = p_0 \frac{2Z_p}{Z_p + Z_w} \frac{Z_f - Z_p}{Z_f + Z_p} \frac{2Z_w}{Z_w + Z_p}, \qquad \text{Equation 22}$$

The values of the container wall impedance $Z_p$ and the sample impedance $Z_f$ can be further refined. By also using the surface reflection amplitude $p_{SR}$ along with $Z_f$, $Z_p$, $Z_w$, $Z_a$, and $p_0$. The amplitude of the SR-sweep curve peak 1142 of FIG. 11 provides $p_{TB}$. The signal path is represented by FIG. 12E. The resulting equation becomes:

$$p_{SR} = p_0 \frac{2Z_p}{Z_p + Z_w} \frac{2Z_f}{Z_f + Z_p} \frac{Z_a - Z_f}{Z_a + Z_f} \frac{2Z_p}{Z_f + Z_p} \frac{2Z_w}{Z_w + Z_p}, \qquad \text{Equation 23}$$

By using equations 21 to 23, the values for the container wall impedance $Z_p$ and the sample impedance $Z_f$ can be iteratively adjusted to identify the values that best correlate to the bottom of bottom amplitude $p_{BB}$, top of bottom amplitude $p_{TB}$, and the surface reflection amplitude $p_{SR}$.

Acoustic Attenuations of the Container and the Sample

Acoustic attenuation is a measure of the energy loss of sound as it propagates through a media. Acoustic attenuation is a property of a given medium. Using the techniques described herein, it may be possible to measure the acoustic attenuation of the material of a container 122 (or more simply, a container 122 attenuation). In particular, an additional sweep or set of sweeps described in conjunction with FIGS. 12A-12E may be performed, but without the sample 101. In other words, sweep(s) are performed both with the sample 101 and without the sample 101. The order of the sweep(s) (with and without sample 101) may not matter. Further, the additional sweep data may be similar to what is shown in FIGS. 8, 9, 10, and 11, but without the sample free surface reflection 812 (FIG. 8), SR-sweep curve 1140 (FIG. 11), and SR-sweep curve peak 1142 (FIG. 11). Further, the sweep data may differ when no sample 101 is present, but the general principles, especially regarding timing, may remain similar.

To determine the container 122 attenuation, the container 122 may be empty before measurements are taken—i.e., the container 122 holds no sample 101. The methods for determining $Z_f$, $Z_p$, $Z_w$, $Z_a$, $T_p$, and $p_0$ may remain the same as described above. The amplitude of the TBL-sweep curve peak 1122 of FIG. 11 without the presence of the sample 101 provides $p_{TB,empty}$. The amplitude of TBL-sweep curve peak 112 may be higher when measuring without the sample 101. FIG. 12C illustrates the geometrical arrangements and relationships, though as mentioned, the sample 101 may not be present when determining the container 122 attenuation. In this case, the container 122 attenuation $\alpha_p$ can be solved using Eq. 24 (which is adapted from Eq. 22):

$$\alpha_p = \frac{1}{2T_p} \ln \left( \frac{\frac{2Z_p}{Z_p + Z_w} \frac{Z_a - Z_p}{Z_a + Z_p} \frac{2Z_w}{Z_w + Z_p}}{p_{TB,empty}/p_0} \right), \qquad \text{Equation 24}$$

Once $\alpha_p$ is determined, the acoustic attenuation of the sample 101 may be determined by using $p_{SR}$ along with $Z_f$, $Z_p$, $Z_w$, $Z_a$, $T_p$, and $p_0$. The amplitude of the SR-sweep curve peak 1142 of FIG. 11 provides $p_{SR}$. The signal path is represented by FIG. 12E. The resulting equation (which is adapted from Eq. 23) becomes:

$$\alpha_f = \frac{1}{2T_f} \ln \left( \frac{\frac{2Z_p}{Z_p + Z_w} \frac{2Z_f}{Z_f + Z_p} \frac{Z_a - Z_f}{Z_a + Z_f} \frac{2Z_p}{Z_f + Z_p} \frac{2Z_w}{Z_w + Z_p}}{p_{SR}/p_0} \right) - \alpha_p \frac{T_p}{T_f} \qquad \text{Equation 25}$$

As used in equations 20 to 22 and 24 to 25 (or otherwise), the values for the bottom of bottom amplitude $p_{BB}$, top of bottom amplitude $p_{TB}$, and the surface reflection amplitude $p_{SR}$ may be adjusted to calibrate the measurement instrumentation. Other aspects of the techniques disclosed herein may be calibrated as well for a given measurement system, such as a portion of system 100 (e.g., transducer assembly 110, electronics 140, and/or motors 150). This may be performed by performing measurement(s) with one or more containers and samples, each having known properties as relevant to the techniques described herein. Since the properties of the container(s) and sample(s) are known, the measured characteristic(s) are also known if system 100 is ideal. As is understood, systems are rarely if ever ideal. The predicted measurements may be compared to actual measurements. This may provide calibration information—i.e., information sufficient to calibrate a portion of system 100 (e.g., transducer assembly 110, electronics 140, and/or motors 150). Once a portion of system 100 (e.g., transducer assembly 110, electronics 140, and/or motors 150) is calibrated, no further adjustment may be needed. In an ideal system, it may not be necessary to further adjust the empirically-determined values of $p_{BB}$, $p_{TB}$, and/or $p_{SR}$. However, it may be useful to perform additional adjustment due to possible nonlinearities in the electronics 140 and/or transducer assembly 110 (including transducer 112 and acoustic lens 113), or due to any deviation from plane waves in the focus of the transducer. Thus, the aforementioned peak values (or other values, as will be understood) may be adjusted to account for variations in equipment behavior, performance, or deviance from theory. Calibration information may be used to adjust the operation of system 100 and/or to adjust processing of data generated during the measurement process. Calibration may be performed only once for given parts of system 100, as discussed, or may be performed periodically or occasionally as parts of system 100 age or are moved to different environments.

Once some or all of the characteristics of the sample 101 and the container 122 have been determined, these can be used by the system to determine parameters for ADE to result in more precise and accurate droplet ejection.

In some embodiments, a machine learning model employing one or more neural networks may be used to determine parameters for ADE based on the concepts disclosed herein. For example, data associated with waveforms of reflections from sweeps may be used to train a machine learning model (which may be trained using supervised learning, unsupervised learning, etc.), and this trained model may be used to determine ADE parameters. In some embodiments, one or more of the relationships disclosed herein may be inputted as constraints for the machine learning model (e.g., one or more of equations 4, 8, and 13).

Many of the techniques described herein, as will be understood, may be implemented on or in conjunction with a computer storage product with a non-transitory computer-readable medium (also can be referred to as a non-transitory processor-readable medium) having instructions or computer code thereon for performing various computer-implemented operations. The medium can include one or more distinct media. The code may be executed on one or more processors, such as processor 143. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware (e.g., processor 143), or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.), interpreted languages (JavaScript, typescript, Perl) or other suitable programming languages and/or development tools. Additional examples of computer code include, but are not limited to, control signals, encrypted code, and compressed code.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A system for acoustically measuring at least one characteristic, wherein the at least one characteristic comprises at least one of a characteristic of a container or a characteristic of a liquid within the container, the system comprising:

a transducer configured to emit a plurality of emitted signals towards the container bottom wall, and receive a corresponding plurality of reflected signals, wherein the plurality of emitted signals comprises a first emitted signal and a second emitted signal, the plurality of reflected signals comprises a first reflected signal comprising a reflection of the first emitted signal and a second reflected signal comprising a reflection of the second emitted signal, the plurality of emitted signals and the plurality of reflected signals comprise acoustic signals;

a controller configured to move the transducer into a plurality of transducer positions along a first dimension with respect to the container bottom wall, the first dimension comprises a vertical dimension, and wherein the plurality of transducer positions comprises a first transducer position and a second transducer position, the second position being separated from the first position along the vertical dimension; and a processor configured to measure the at least one characteristic in part by processing data associated with the plurality of reflected signals, wherein the transducer is configured to emit the first emitted signal when the transducer is in the first transducer position, and wherein the transducer is configured to emit the second emitted signal when the transducer is in the second transducer position;

wherein the at least one characteristic comprises a longitudinal sound speed of the emitted signal through the container bottom wall, or a shear sound speed of the emitted signal through the container bottom wall.

2. The system of claim 1, wherein the at least one characteristic further comprises at least one of a depth of the liquid within the container, an acoustic impedance of the liquid within the container, a sound speed of the emitted signal through the liquid within the container, or an acoustic attenuation of the liquid within the container.

3. The system of claim 1, wherein the processor is further configured to determine at least one of an acoustic impedance of the container, a thickness of the container bottom wall, or an acoustic attenuation of the container.

4. The system of claim 1, wherein:

the container comprises a first well, a second well, and a third well;

the system is further configured to measure the at least one characteristic for each of the first well, the second well, and the third well; and the controller is further configured to move the transducer along a second dimension from under the first well to under the second well, wherein the controller is further configured to move the transducer along a third dimension from under the second well to under the third well, and wherein the second dimension and the third dimension comprise X and Y horizontal dimensions, respectively.

5. The system of claim 4, wherein the container is configured to contain a first liquid, a second liquid, and a third liquid in the first well, the second well, and the third well, respectively, and wherein the system is further configured to measure at least one characteristic for each of the first liquid, the second liquid, and the third liquid when measuring the at least one characteristic for each of the first well, the second well, and the third well, respectively.

6. The system of claim 5, wherein the at least one characteristic comprises, for each well, at least one of a respective acoustic impedance of the contained liquid, a respective acoustic attenuation of the contained liquid, or a respective sound speed of the emitted signal through the contained liquid.

7. The system of claim 6, wherein the processor is further configured to determine, for the container bottom wall of each well, at least one of an acoustic impedance, a thickness, or an acoustic attenuation.

8. The system of claim 1, wherein the system further comprises:

a coupling liquid between the transducer and the container bottom wall; and a temperature sensor configured to measure a temperature of the coupling liquid, wherein the processor is further configured to measure the at least one characteristic in part by processing data corresponding to the temperature of the coupling liquid.

9. The system of claim 1, wherein measuring the at least one characteristic in part by processing data associated with the plurality of reflected signals comprises:

defining a first curve using the data associated with the plurality of reflected signals;

ascertaining a peak of the first curve corresponding to a first echo; and determining the at least one characteristic at least in part based on the ascertained first peak.

10. The system of claim 9, wherein measuring the at least one characteristic in part by processing data associated with the plurality of reflected signals further comprises:

ascertaining a second peak of the second curve corresponding to a second echo; and determining the at least one characteristic based at least in part on both the ascertained first peak and the ascertained second peak.

* * * * *